(12) United States Patent
Gargash et al.

(10) Patent No.: US 8,615,755 B2
(45) Date of Patent: *Dec. 24, 2013

(54) SYSTEM AND METHOD FOR MANAGING RESOURCES OF A PORTABLE COMPUTING DEVICE

(75) Inventors: Norman S. Gargash, Boulder, CO (US); Praveen Kumar Chidambaram, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 12/882,395

(22) Filed: Sep. 15, 2010

(65) Prior Publication Data

US 2012/0066391 A1    Mar. 15, 2012

(51) Int. Cl.
| | |
|---|---|
| *G06F 9/44* | (2006.01) |
| *G06F 9/445* | (2006.01) |
| *G06F 15/173* | (2006.01) |
| *G06F 15/16* | (2006.01) |

(52) U.S. Cl.
USPC ........... 717/174; 717/106; 717/120; 717/164; 717/168; 709/217; 709/226

(58) Field of Classification Search
USPC ................. 709/227, 310, 219–226, 252, 217; 702/127; 718/104; 714/6.32; 710/261; 719/310, 318; 713/100; 717/174, 175, 717/106, 120, 164, 168; 455/408, 418
See application file for complete search history.

(56) References Cited

U.S. PATENT DOCUMENTS

| | | | |
|---|---|---|---|
| 6,332,167 B1 | 12/2001 | Peters et al. | |
| 6,571,354 B1 * | 5/2003 | Parks et al. | .................. 714/6.32 |
| 6,574,654 B1 | 6/2003 | Simmons et al. | |
| 6,715,145 B1 | 3/2004 | Bowman-Amuah | |

(Continued)

FOREIGN PATENT DOCUMENTS

| | | |
|---|---|---|
| EP | 1933237 A1 | 6/2008 |
| WO | WO0184301 A2 | 11/2001 |
| WO | WO 2010/001322 A1 | 1/2010 |
| WO | 2010120247 A1 | 10/2010 |

OTHER PUBLICATIONS

"C++ Primer", Fourth Edition by Stanley B. Lippman, Josée Lajoie, Barbara E. Moo; Published by Addison Wesley Professional on Feb. 14, 2005, ISBN: 0-201-72148-1.*

(Continued)

*Primary Examiner* — Wing F Chan
*Assistant Examiner* — Raji Krishnan
(74) *Attorney, Agent, or Firm* — Nicholas A. Cole

(57) ABSTRACT

A method and system for managing resources of a portable computing device is disclosed. The method includes receiving node structure data for forming a node, in which the node structure data includes a unique name assigned to each resource of the node. A node has at least one resource and it may have multiple resources. Each resource may be a hardware or software element. The system includes a framework manger which handles the communications between existing nodes within a node architecture. The framework manager also logs activity of each resource by using its unique name. The framework manager may send this logged activity to an output device, such as a printer or a display screen. The method and system may help reduce or eliminate a need for customized APIs when a new hardware or software element (or both) are added to a portable computing device.

32 Claims, 16 Drawing Sheets

(56) References Cited

U.S. PATENT DOCUMENTS

| | | | |
|---|---|---|---|
| 6,817,018 | B1 | 11/2004 | Clarke et al. |
| 6,901,446 | B2 | 5/2005 | Chellis et al. |
| 7,050,807 | B1 | 5/2006 | Osborn |
| 7,114,158 | B1 | 9/2006 | Thompson et al. |
| 7,117,273 | B1 * | 10/2006 | O'Toole et al. ............... 709/252 |
| 7,152,157 | B2 | 12/2006 | Murphy et al. |
| 7,337,446 | B2 | 2/2008 | Sankaranarayan et al. |
| 7,694,158 | B2 | 4/2010 | Melpignano et al. |
| 7,814,486 | B2 | 10/2010 | Papakipos et al. |
| 2002/0087734 | A1 * | 7/2002 | Marshall et al. ............. 709/310 |
| 2003/0005167 | A1 | 1/2003 | Khare et al. |
| 2003/0163275 | A1 * | 8/2003 | Farrell et al. ................. 702/127 |
| 2004/0068723 | A1 | 4/2004 | Graupner et al. |
| 2005/0183143 | A1 | 8/2005 | Anderholm et al. |
| 2005/0283759 | A1 * | 12/2005 | Peteanu et al. ............... 717/120 |
| 2006/0101453 | A1 * | 5/2006 | Burkhart et al. ............. 717/168 |
| 2006/0150188 | A1 * | 7/2006 | Roman et al. ................ 718/104 |
| 2007/0136725 | A1 | 6/2007 | Accapadi et al. |
| 2007/0294364 | A1 * | 12/2007 | Mohindra et al. ............ 709/217 |
| 2007/0294698 | A1 * | 12/2007 | Thoelke et al. ............... 718/104 |
| 2008/0022286 | A1 | 1/2008 | Chung et al. |
| 2008/0034195 | A1 | 2/2008 | Gilliam et al. |
| 2008/0049614 | A1 * | 2/2008 | Briscoe et al. ................ 370/230 |
| 2008/0085717 | A1 | 4/2008 | Chhabra et al. |
| 2008/0086470 | A1 | 4/2008 | Graefe |
| 2008/0229320 | A1 | 9/2008 | Ueda |
| 2008/0244507 | A1 * | 10/2008 | Hodson et al. ............... 717/106 |
| 2008/0244599 | A1 | 10/2008 | Hodson et al. |
| 2008/0294777 | A1 * | 11/2008 | Karve et al. .................. 709/226 |
| 2009/0007153 | A1 | 1/2009 | Mysore et al. |
| 2009/0043809 | A1 | 2/2009 | Fakhouri et al. |
| 2009/0049438 | A1 * | 2/2009 | Draper et al. ................. 717/168 |
| 2009/0090783 | A1 | 4/2009 | Killian et al. |
| 2009/0158292 | A1 | 6/2009 | Rattner et al. |
| 2010/0138818 | A1 * | 6/2010 | Harrop et al. ................ 717/153 |
| 2010/0138825 | A1 * | 6/2010 | Harrop ......................... 717/174 |
| 2010/0162247 | A1 | 6/2010 | Welc et al. |
| 2010/0218194 | A1 | 8/2010 | Dallman et al. |
| 2010/0333095 | A1 | 12/2010 | Shavit et al. |
| 2011/0010478 | A1 | 1/2011 | Zou et al. |
| 2011/0138135 | A1 | 6/2011 | Dice et al. |
| 2012/0124566 | A1 * | 5/2012 | Federighi et al. ............. 717/164 |
| 2012/0227053 | A1 | 9/2012 | Gargash et al. |
| 2012/0239812 | A1 | 9/2012 | Gargash et al. |
| 2013/0019249 | A1 * | 1/2013 | Gargash et al. ............... 718/104 |
| 2013/0031560 | A1 | 1/2013 | Gargash et al. |

OTHER PUBLICATIONS

The CORBA Component Model_Part 1, Evolving Towards Component Middleware _Dr Dobb's.pdf Schmidt and Vinoski, "The Corba Component Model: Part 1, Evolving Towards Component Middleware", Feb. 1, 2004 from http://www.drdobbs.com/the-corba-component-model-part-1-evolvin/184403884.*

"OSGi Service Platform Core Specification" from The OSGi Alliance, Release 4, Version 4.0.1 Jul. 2006 (2006 r4.core.pdf).*

"OSGi Service Platform Mobile Specification" from The OSGi Alliance, Release 4, Version 4.0 Jul. 2006 (2006 r4.mobile.pdf).*

International Search Report and Written Opinion—PCT/US2011/043282, ISA/EPO—Oct. 7, 2011.

Berenson H., et al., "A critique of ANSI SQL Isolation Levels", SIGMOD Record, ACM, New York, NY, US, vol. 24, No. 2, Jun. 1, 1995, pp. 1-10, XP002234701, ISSN: 0163-5808, DOI: 10.1145/568271.223785.

Gamma E., et al., "Design Patterns: elements of reusable object-oriented software passage", Design Patterns. Elements of Reusable Object-Oriented Software, XX, XX, Jan. 1, 1995, pp. 1-9, 207, XP002200550.

Plasil F., et al., "An architectural view of distributed objects and components in CORBA, Java RMI and COM/DCOM", Internet Citation, Jun. 1998, XP002326430, Retrieved from the Internet: URL:www.informatik.uni-trier.de/~ley/db/journals/stp/stp19.html [retrieved on Apr. 28, 2005].

* cited by examiner

SYSTEM AND METHOD FOR MANAGING RESOURCES OF A PORTABLE COMPUTING DEVICE

DESCRIPTION OF THE RELATED ART

Portable computing devices (PCDs) are becoming personal necessities for people on personal and professional levels. These devices may include cellular telephones, portable digital assistants (PDAs), portable game consoles, palmtop computers, and other portable electronic devices. Each of these devices may include a primary function. For example, a cellular telephone generally has the primary function of receiving and transmitting telephone calls.

In addition to the primary function of these devices, many include peripheral functions. For example, a cellular telephone may include the primary function of making cellular telephone calls as described above, and the peripheral functions of a still camera, a video camera, global positioning system (GPS) navigation, web browsing, sending and receiving emails, sending and receiving text messages, push-to-talk capabilities, etc. As the functionality of such a device increases, the computing or processing power required to support such functionality also increases. Further, as the computing power increases, there exists a greater need to effectively manage the processor, or processors, that provide the computing power.

In the past, as each peripheral function supported by hardware or software (or both) was introduced to a device such as a cellular telephone, a specific application programming interface (API) was introduced for each peripheral function. For example, there may be a separate API for the video camera and a separate API for the GPS navigation application software. Each API generally logged its actions independently and each API generally has its own data structure which would need to cross reference the existing hardware or software of the cellular telephone that was in existence prior to the introduction of the new peripheral function.

The introduction of separate APIs for each peripheral function is very cumbersome and time-consuming because of the cross reference to different hardware and software elements. Each hardware or software element supporting the base functions of the cellular telephone may have been provided with a nomenclature established by the original equipment manufacturer (OEM) of the cellular telephone and/or the OEM of the underlying electronic supporting the base functions of the cellular telephone. The logging and debugging of new features or functions associated with software or hardware (or both) has long been recognized by those of ordinary skill in this portable computing device art as a significant problem in providing new products or features (or both).

What is needed is a system and method that may overcome the problems associated with introducing new features or functions supported by new software or hardware (or both) that are added to systems built by original equipment manufacturers (OEMs).

SUMMARY OF THE DISCLOSURE

A method and system for managing resources of a portable computing device is disclosed. The method includes receiving node structure data for forming a node, in which the node structure data includes a unique name assigned to each resource of the node. A node has at least one resource and it may have multiple resources. Each resource may be a hardware or software element. The system includes a framework manger which handles the communications between existing nodes within a node architecture. The framework manager also logs activity of each resource by using its respective unique name. The framework manager may send this logged activity to memory, nonvolatile storage such as an embedded file system, or an output device, such as a printer or a display screen. The method and system may help reduce or eliminate a need for customized APIs when a new hardware or software element (or both) are added to a portable computing device.

According to a first exemplary aspect, a method for managing resources of a portable computing device includes receiving node structure data for forming a node, in which the node structure data includes a unique name. The method further includes reviewing the node structure data for one or more dependencies and then determining if each resource associated with a dependency exists within a node framework. If a resource associated with a dependency does not exist, then the node structure data is stored in a temporary storage. If each resource for each dependency exists, then the node and its one or more corresponding resources is created. If the node is created, then the node is published within the node framework using its corresponding unique name in a state ready for processing communications.

According to another exemplary aspect, a computer system for managing resources of a portable computing device includes a processor operable to receive node structure data for forming a node, in which the node structure data comprising a unique name for each resource that is part of the node. The processor is also operable to review the node structure data for one or more dependencies and the processor is operable to determine if each resource associated with a dependency exists within a node framework. If a resource associated with a dependency does not exist, then the processor is operable to store the node structure data in a temporary storage. If each resource for each dependency exists, then the processor is operable to create the node and its one or more corresponding resources. If the node is created, then the processor is operable to publish the node within the node framework using the one or more unique names corresponding node's one or more resources in a state ready for processing communications.

According to another exemplary aspect, a computer system for managing resources of a portable computing device includes means for receiving node structure data for forming a node, in which the node structure data comprises a unique name for each resource that is part of the node. The computer system further has means for reviewing the node structure data for one or more dependencies and means for determining if each resource associated with a dependency exists within a node framework. The computer system further includes means for storing the node structure data in a temporary storage if a resource associated with a dependency does not exist. The computer system also has means for creating the node and its one or more corresponding resources if each resource for each dependency exists. The computer system further has means for publishing the node within the node framework using the one or more unique names corresponding node's one or more resources in a state ready for processing communications if the node is created.

According to a further aspect, a computer program product includes a computer usable medium having a computer readable program code embodied therein in which the program code is adapted to be executed and to implement a method for managing resources of a portable computing device. The method implemented by the code includes receiving node structure data for forming a node, in which the node structure data has a unique name for each resource that is part of the node. The method also includes reviewing the node structure data for one or more dependencies and determining if each resource associated with a dependency exists within a node framework. If a resource associated with a dependency does not exist, then the method stores the node structure data in a temporary storage. If each resource for each dependency exists, then the process creates the node and its one or more corresponding resources. If the node is created, then the process publishes the node within the node framework using the one or more unique names corresponding node's one or more resources in a state ready for processing communications.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") wireless technology, greater bandwidth availability has enabled more portable computing devices with a greater variety of wireless capabilities. Therefore, a portable computing device may be a cellular telephone, a pager, a PDA, a smartphone, a navigation device, or a hand-held computer with a wireless connection or link.

Figure 1:
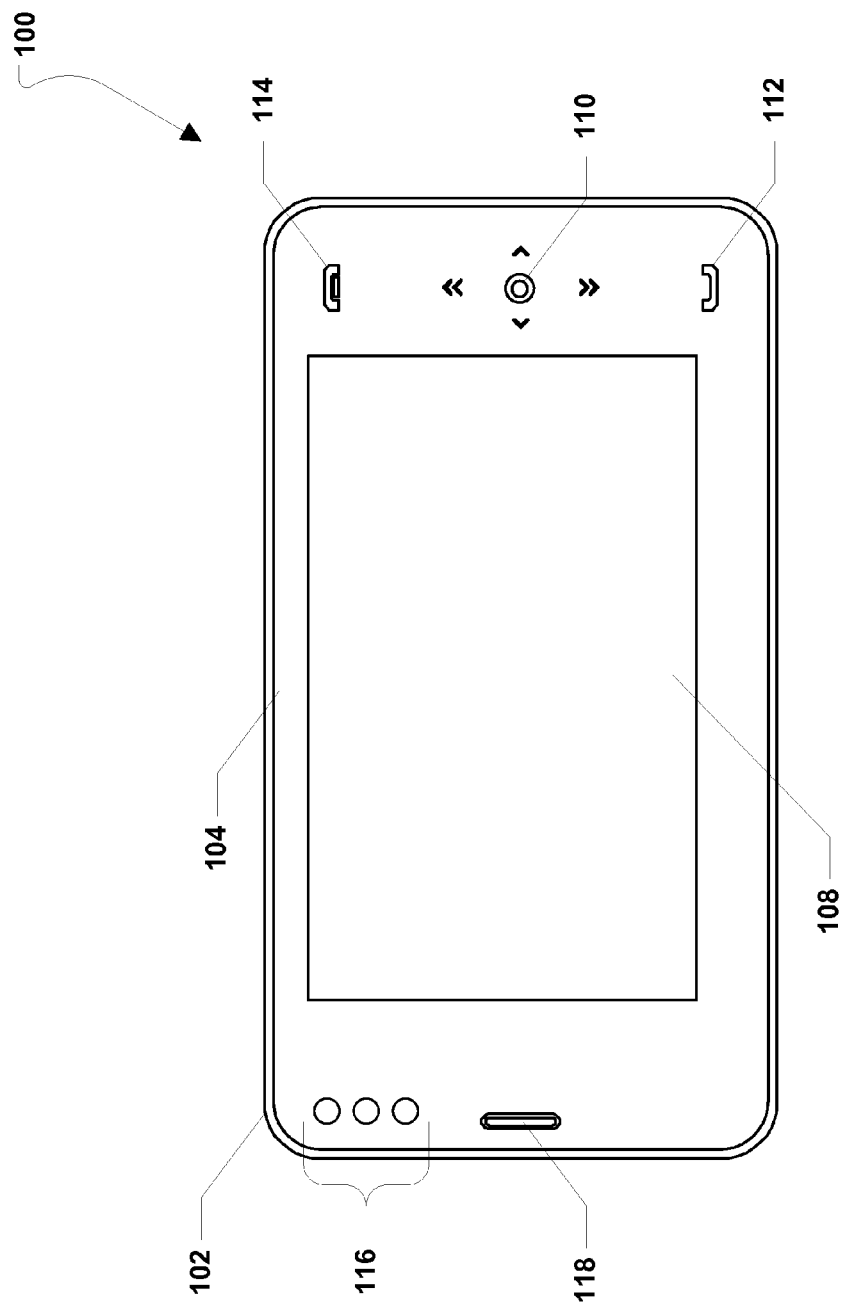
FIG. 1 is a front plan view of a first aspect of a portable computing device (PCD) in a closed position.
Figure 2:
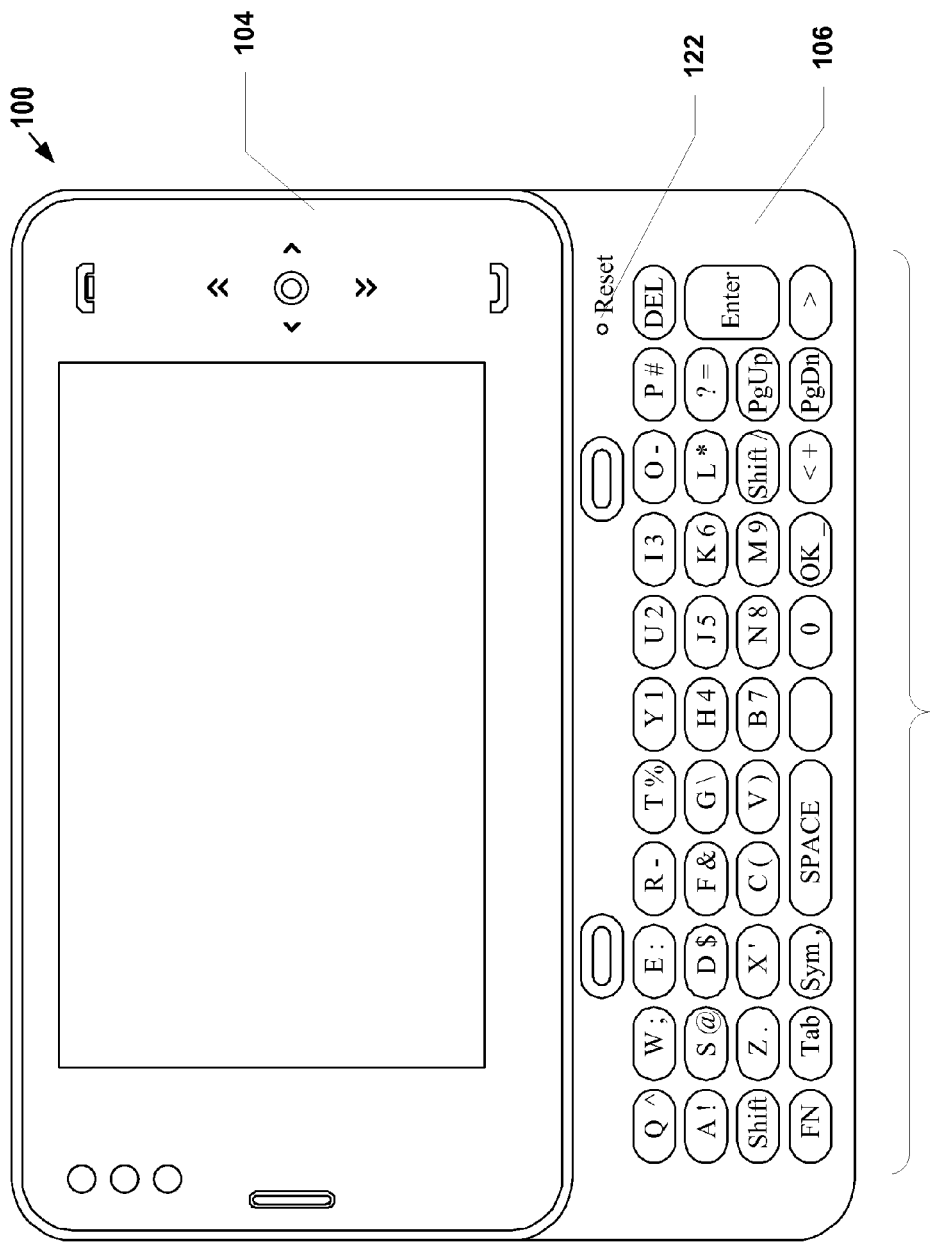
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106 (FIG. 2). FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
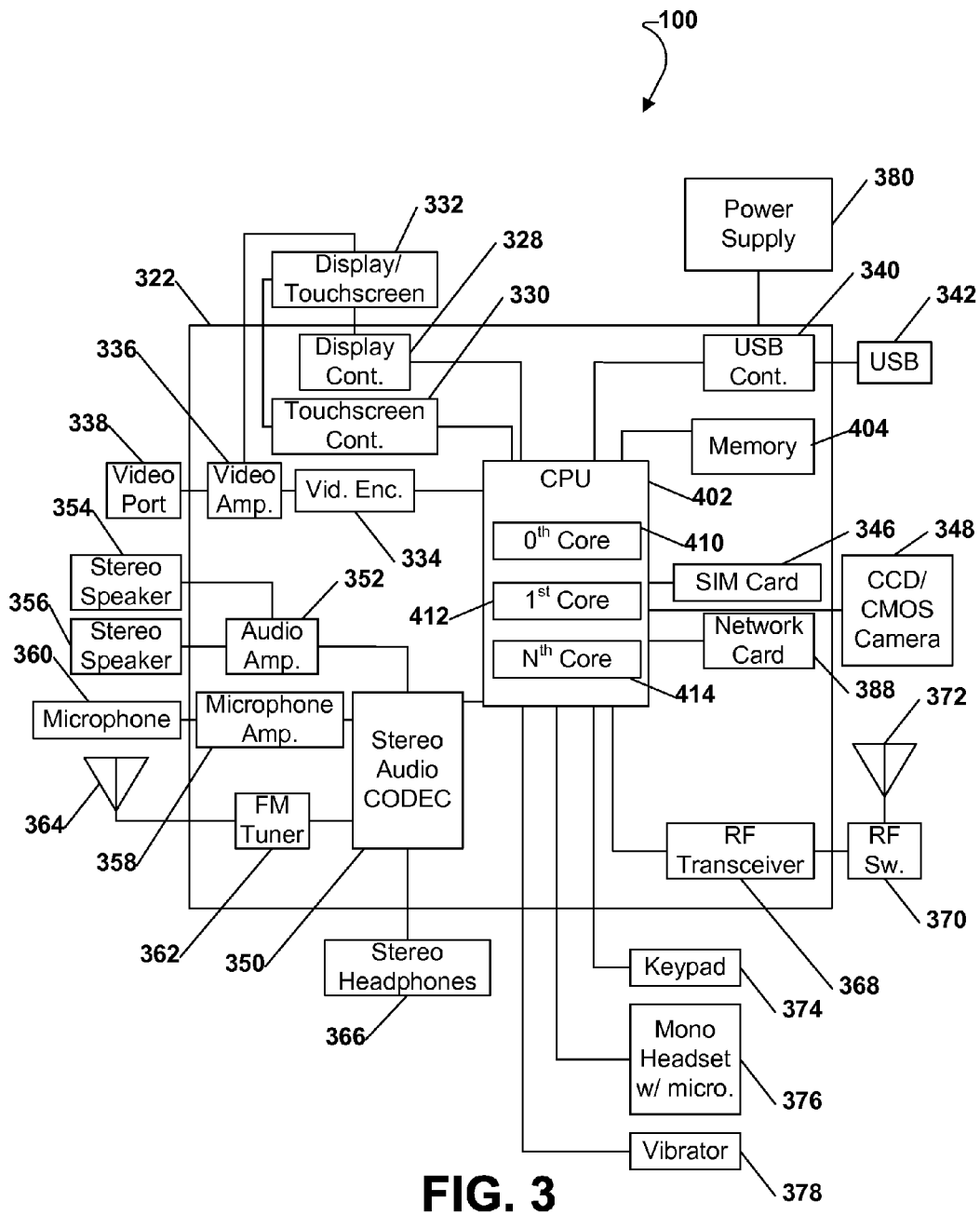
FIG. 3 is a block diagram of a second aspect of a PCD.

Referring to FIG. 3, an exemplary, non-limiting aspect of a portable computing device (PCD) is shown and is generally designated 100. As shown, the PCD 100 includes an on-chip system 322 that includes a multicore CPU 402. The multicore CPU 402 may include a zeroth core 410, a first core 412, and an Nth core 414.

As illustrated in FIG. 3, a display controller 328 and a touch screen controller 330 are coupled to the multicore CPU 402. In turn, a touch screen display 108 external to the on-chip system 322 is coupled to the display controller 328 and the touch screen controller 330.

FIG. 3 further illustrates a video encoder 334, e.g., a phase alternating line (PAL) encoder, a sequential color a memoire (SECAM) encoder, or a national television system(s) committee (NTSC) encoder, are coupled to the multicore CPU 402. Further, a video amplifier 336 is coupled to the video encoder 334 and the touch screen display 108. Also, a video port 338 is coupled to the video amplifier 336. As depicted in FIG. 3, a universal serial bus (USB) controller 340 is coupled to the multicore CPU 402. Also, a USB port 342 is coupled to the USB controller 340. A memory 404 and a subscriber identity module (SIM) card 346 may also be coupled to the multicore CPU 402. Further, as shown in FIG. 3, a digital camera 348 may be coupled to the multicore CPU 402. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 402. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the multicore CPU 402. An RF switch 370 may be coupled to the RF transceiver 368 and an RF antenna 372. As shown in FIG. 3, a keypad 374 may be coupled to the multicore CPU 402. Also, a mono headset with a microphone 376 may be coupled to the multicore CPU 402. Further, a vibrator device 378 may be coupled to the multicore CPU 402. FIG. 3 also shows that a power supply 380 may be coupled to the on-chip system 322. In a particular aspect, the power supply 380 is a direct current (DC) power supply that provides power to the various components of the PCD 100 that require power. Further, in a particular aspect, the power supply is a rechargeable DC battery or a DC power supply that is derived from an alternating current (AC) to DC transformer that is connected to an AC power source.

FIG. 3 further indicates that the PCD 100 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the touch screen display 108, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 404 as computer program instructions. These instructions may be executed by the multicore CPU 402 in order to perform the methods described herein. Further, the multicore CPU 402, the memory 404, or a combination thereof may serve as a means for executing one or more of the method steps described herein in order to sample data within a central processing unit 402.

Figure 4:
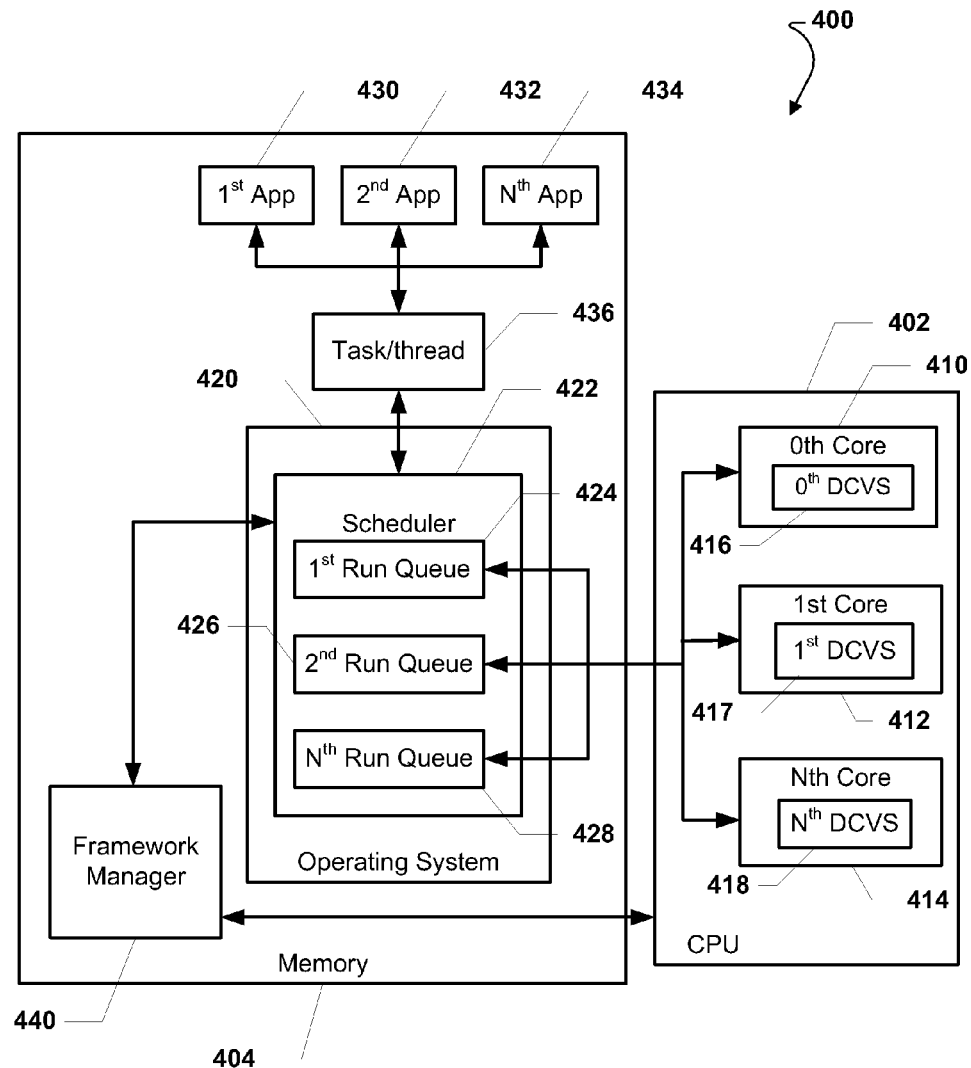
FIG. 4 is a block diagram of a processing system.

Referring to FIG. 4, a processing system is shown and is generally designated 400. In a particular aspect, the processing system 400 may be incorporated into the PCD 100 described above in conjunction with FIG. 3. As shown, the processing system 400 may include a multicore central processing unit (CPU) 402 and a memory 404 connected to the multicore CPU 402. The multicore CPU 402 may include a zeroth core 410, a first core 412, and an Nth core 414. The zeroth core 410 may include a zeroth dynamic clock and voltage scaling (DCVS) algorithm 416 executing thereon. The first core 412 may include a first DCVS algorithm 417 executing thereon. Further, the Nth core 414 may include an Nth DCVS algorithm 418 executing thereon. In a particular aspect, each DCVS algorithm 416, 417, 418 may be independently executed on a respective core 412, 414, 416.

Moreover, as illustrated, the memory 404 may include an operating system 420 stored thereon. The operating system 420 may include a bus arbiter or scheduler 422 and the scheduler 422 may include a first run queue 424, a second run queue 426, and an Nth run queue 428. The memory 404 may also include a first application 430, a second application 432, and an Nth application 434 stored thereon.

In a particular aspect, the applications 430, 432, 434 may send one or more tasks 436 to the operating system 420 to be processed at the cores 410, 412, 414 within the multicore CPU 402. The tasks 436 may be processed, or executed, as single tasks, threads, or a combination thereof. Further, the scheduler 422 may schedule the tasks, threads, or a combination thereof for execution within the multicore CPU 402. Additionally, the scheduler 422 may place the tasks, threads, or a combination thereof in the run queues 424, 426, 428. The cores 410, 412, 414 may retrieve the tasks, threads, or a combination thereof from the run queues 424, 426, 428 as instructed, e.g., by the operating system 420 for processing, or execution, of those task and threads at the cores 410, 412, 414.

FIG. 4 also shows that the memory 404 may include a framework manager 440 stored thereon. The framework manager 440 may be connected to the operating system 420 and the multicore CPU 402. Specifically, the framework manager 440 may be connected to the scheduler 422 within the operating system 420. As described herein, the framework manager 440 may monitor the workload on the cores 410, 412, 414 and the framework manager 440 may sample data from the cores 410, 412, 414 as described below.

In a particular aspect, the framework manager 440 may be a software program. However, in an alternative aspect, the framework manager 440 may be a hardware controller that is external to the memory 404. In either case, the framework manager 440, the memory 404, the cores 410, 412, 414, or any combination thereof may serve as a means for executing one or more of the method steps described herein in order to sample data from the cores 410, 412, 414.

Figure 5:
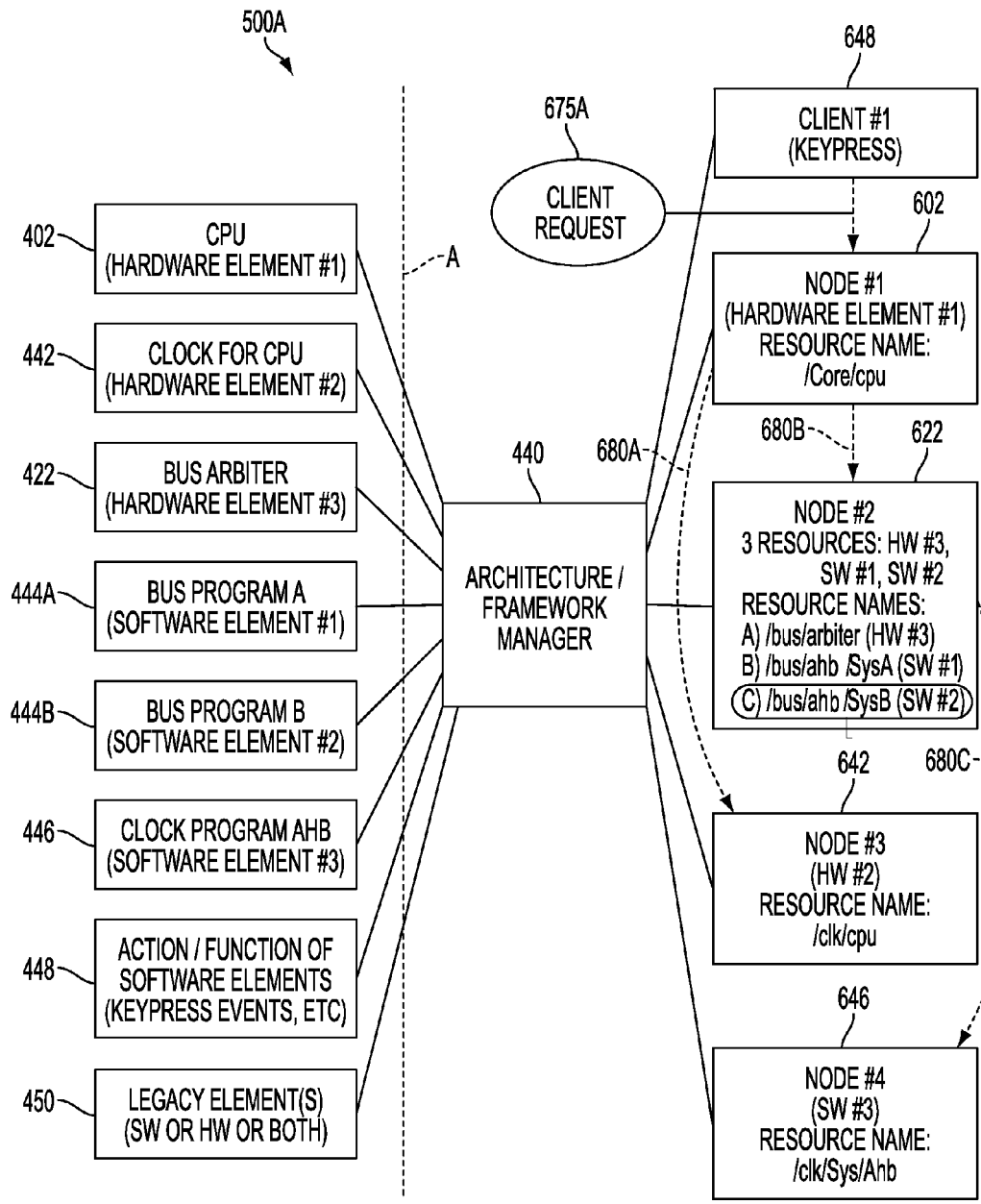
FIG. 5 is a diagram of a first aspect of a software architecture for a system that manages resources of a portable computing device of FIG. 1.

FIG. 5 is a diagram of a first aspect of a software architecture 500A for a system that manages resources of the portable computing device (PCD) of FIG. 1. FIG. 5 is a diagram comprising functional blocks which represent software or hardware (or both). FIG. 5 illustrates an architecture or framework manager 440 that is coupled to a plurality of hardware and software elements, such as, but not limited to: the central processing unit 402, also referred to generally as the first hardware element (hardware element #1); a clock 442 for the CPU 402, also referred to generally as the second hardware element (hardware element #2); a bus arbiter or scheduler 422, also referred to generally as the third hardware element (hardware element #3); a bus program A—444A, also referred to generally as the first software element (software element #1); a bus program B—444B, also referred to generally as the second software element (software element #2); a clock program AHB, referred to generally as the third software element (software element #3); an action or function monitored by a software element generally indicated as a keypress 448; and a legacy element 450 comprising a software element or a hardware element or both.

An example of a legacy software element may include, but is not limited to, a Dynamic Environment Manager (DEM). This is a software module that handles interprocessor notification of processor sleep events. For example, a first processor A uses the DEM to receive a notification that a second processor B has gone idle/come back from idle. On newer hardware, this software functionality has been subsumed into the route processor module (RPM) subsystem/communication protocol. Other legacy software elements exist and are included within the scope of the invention.

An example of a legacy hardware element may include, but is not limited to, an AMBA (Advanced Microcontroller Bus Architecture) High-performance Bus (AHB). On older PCDs 100, the AHB may comprise the primary system bus, whereas on newer PCDs 100, the system bus fabric is completely different and the AHB bus is only used for special applications to communicate with modules that have not yet been updated to communicate via the new system bus fabric. Other legacy hardware elements exist and are included within the scope of the invention.

Figure 6A:
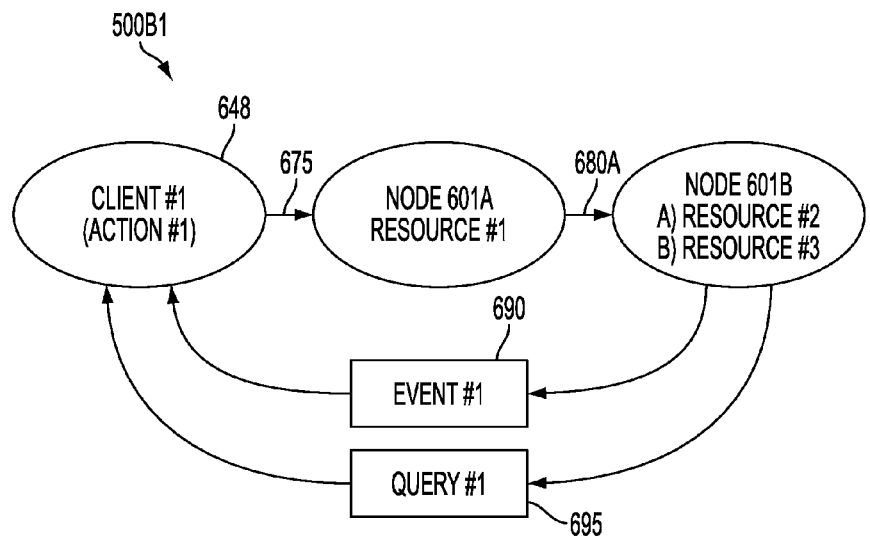
FIGS. 6A and 6B are general and specific diagrams of a second aspect of the software architecture for a system that manages resources of a PCD of FIG. 1.

The framework manager 440 may comprise a library of computer instructions that manages data structures, such as nodes (described below) which communicate with each of the aforementioned hardware and software elements. The framework manager 440 may be responsible for creating one or more resources that may form nodes 602, 622, 642, and 646 as illustrated on the right side of the dashed line A of FIG. 5. Each node 602, 622, 642, and 646 is a representation or model of each software or hardware element on the left hand side of the dashed line A of FIG. 5. For the remainder of this disclosure, a general or non-specific node will be designated with reference numeral 601 as illustrated in FIG. 6A.

As noted previously, each exemplary node 602, 622, 642, and 646 of FIG. 5 may comprise one or more resources. A resource may comprise a software element or hardware element or both. For example, a first node 602 comprises a single resource that generally corresponds with the first hardware element or central processing unit 402. With the inventive software architecture described in this disclosure, each resource of a node 601 may be provided with a unique name comprising one or more alphanumeric characters. In the exemplary embodiment illustrated in FIG. 5, the resource of the first node 602 has been assigned the resource name of "/core/cpu." This exemplary resource name generally corresponds to conventional file naming structures known to one of ordinary skill in the art. However, as recognized by one of ordinary skill the art, other types of resource names containing any other combination of alpha-numeric characters and/or symbols are well within the scope of the invention.

In the exemplary embodiment of FIG. 5, the second node 622 comprises a plurality of resources. Specifically, in this particular exemplary embodiment, the second node 622 has a first resource comprising a single hardware element corresponding to the bus arbiter or scheduler 422. The second resource of the second node 622 comprises a software element generally corresponding to the first software element of the bus program A 444A. The third resource of the second node 622 comprises another software element generally corresponding to the second software element of the bus program B 444B. One of ordinary skill the art recognizes that any combination and any number of resources and resource types for a given node 601 are well within the scope of the invention.

FIG. 5 also illustrates a first client 648 that generally corresponds to an action or function of the two software elements 448, 450. In the exemplary embodiment illustrated in FIG. 5, the client 648 generally corresponds to a keypress action that may occur within a particular application program supported by the portable computing device 100. However, one of ordinary skill in the art recognizes that other actions and/or functions of software elements besides keypresses are well within the scope of the invention. Further details about clients 648 and their respective creation will be described below in connection with FIG. 12.

FIG. 5 also illustrates relationships between particular architectural elements. For example, FIG. 5 illustrates a relationship between the client 648 and the first node 602. Specifically, the first client 648 may generate a client request 675A, illustrated with dashed lines, that is managed or handled by the first node 602 that comprises the resource "/core/cpu." Typically, there are a predetermined or set number of types of client requests 675. Client requests 675 will be described in further detail below in connection with FIG. 13.

Other relationships displayed in FIG. 5 include dependencies illustrated with dashed lines 680. Dependencies are relationships between respective resources of another node 601. A dependency relationship usually indicates that a first resource (A) is reliant upon a second resource (B) that may provide the first resource (A) with information. This information may be a result of an operation performed by a second resource (B) or it may simply comprise status information that is needed by the first resource (A) or any combination thereof. The first resource (A) and second resource (B) may be part of the same node 601 or they may be part of different nodes 601.

In FIG. 5, the first node 602 is dependent upon the second node 622 as indicated by the dependency arrow 680B which originates with the first node 602 and extends to the second at 622. FIG. 5 also illustrates that the first node 602 is also dependent upon the third node 642 as illustrated by the dependency arrow 680 A. FIG. 5 also illustrates that the second node 622 is dependent upon the fourth node 646 as illustrated by the dependency arrow 680C. One of ordinary skill in the art recognizes that the dependencies 680 illustrated with the dashed arrows of FIG. 5 are only exemplary in nature and that other combinations of dependencies between respective nodes 601 are within the scope of the invention.

The architecture or framework manager 440 is responsible for maintaining the relationships described above, that include, but are not limited to the client requests 675 and the dependencies 680 illustrated in FIG. 5. The framework manager 440 will try to instantiate or create as many nodes 601 as it can as long as the dependencies 680 for any given node 601 are complete. A dependency 680 is complete when a resource which supports a dependency is in existence or is in a ready state for handling information that relates to the dependency 680.

For example, the first node 602 comprising the single resource "/core/cpu" may not be created or established by the framework manager 440 if the third node 642 comprising the single resource "/clk/cpu" has not been created because of the dependency relationship 680A that exist between the first node 602 in the third node 642. Once the third node 642 has been created by the framework manager 440, then the framework manager 440 may create the first node 602 because of the dependency relationship 680A.

If the framework manager 440 is unable to create or instantiate a particular node 601 because one or more of its dependencies 680 are incomplete, the framework manager 440 will continue running or executing steps corresponding to those nodes 601 that were created successfully by the framework manager 440. The framework manger 440 will usually skip over a call for a particular node 601 which may not exist due to incomplete dependencies in which dependent resources have not been created and return messages to that call which reflect that incomplete status.

In a multicore environment, such as illustrated in FIG. 4, the framework manager 440 may create or instantiate nodes 601 on separate cores, like the first second and Nth cores 424, 426, and 428 of FIG. 4. Nodes 601 may generally be created in a multicore environment on separate cores and in parallel as long as the nodes 601 are not dependent on one another and if all of a particular node's corresponding dependencies, as described below, are complete.

FIG. 6A is a general diagram of a second aspect of the software architecture 500B1 for a system that manages resources of a PCD 100 of FIG. 1. In this general diagram, the one or more resources of each node 601 have not been provided with unique names. The node or resource graph 500B1 of FIG. 6A comprises only the nodes 601, clients 648, events 690, and query functions 695 supported by the architecture or framework manager 440. Each node 601 has been illustrated with an oval shape and arrows 680 with specific directions which represent respective dependencies between resources within a node 601.

Figure 6B:
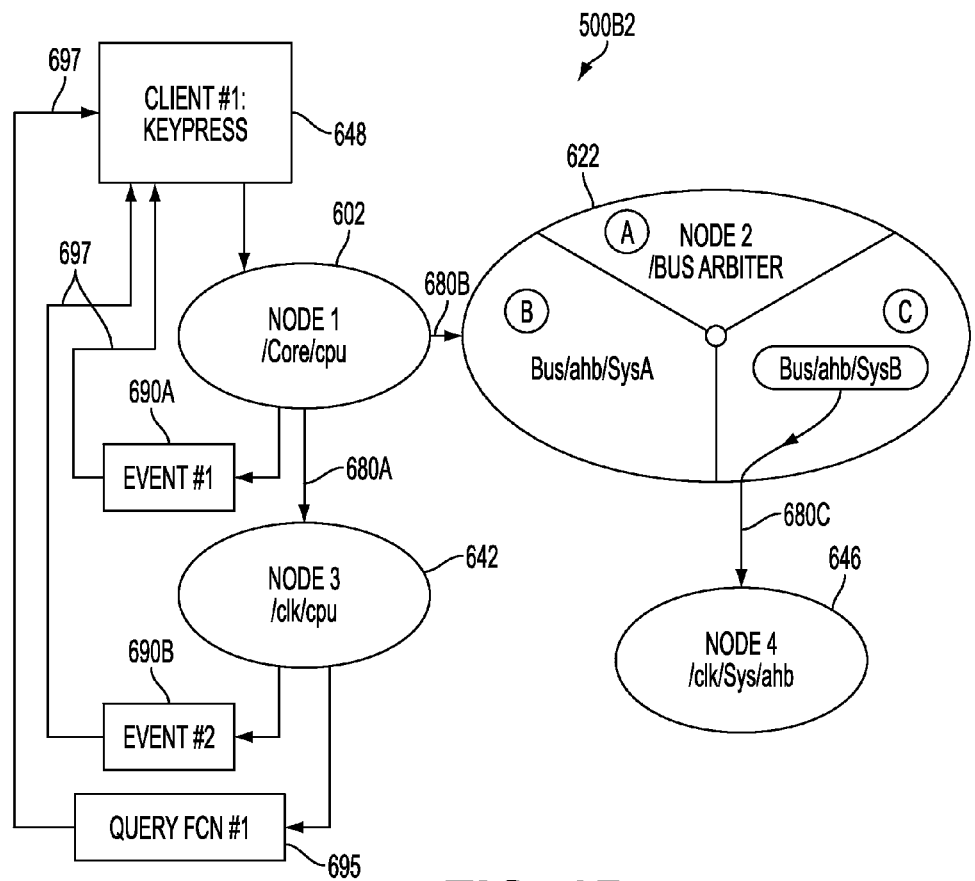

Calls within the node architecture illustrated in FIGS. 6A-B may be made to an alias, or an actual resource name of a resource within a node 601. For example, the first node 601A has a dependency arrow 680A to indicate that the first node 601A is dependent upon the two resources (resources #2 and #3) of the second node 601B. FIG. 6A also illustrates how a client 648 of the first node 601A may issue a client request 675 to the first node 601A. After these client requests 675 are issued, the second node 601B may trigger an event 690 or provide a response to a query 695, in which messages corresponding to the event 690 and the query 695 flow back to the client 648.

FIG. 6B is a specific diagram of a second aspect of the software architecture 500B2 for a system that manages resources of a PCD 100 of FIG. 1. FIG. 6B illustrates a node or resource graph 500B2 that comprises only the nodes 601 with specific, yet exemplary resource names, as well as clients 648, events 690, and query functions 695 corresponding to those of FIG. 5. Each node 601 has been illustrated with an oval shape and arrows 680 with specific directions which represent respective dependencies between resources within a node 601.

For example, the first node 602 has a dependency arrow 680B to indicate that the first node 602 is dependent upon the three resources of the second node 622. Similarly, the third resource "/bus/ahb/sysB/" comprising the second software element 444B and generally designated with the reference letter "C" in FIG. 6B has a dependency arrow 680C that indicates this third resource (C) is dependent upon the single "/clk/sys/ahb" resource of the fourth node 646.

FIG. 6B also illustrates the output data from nodes 601 which may comprise one or more events 690 or query functions 695. A query function 695 is similar to an event 690. The query function 695 may have a query handle that may or may not be unique.

The query function is generally not externally identified and generally, it does not have a state. The query function 695 may be used to determine the state of a particular resource of a node 601. The query function 695 and the events 690 may have relationships with established clients 648 and these relationships are represented by directional arrows 697 to indicate that information from respective event 690 and query function 695 are passed to a particular client 648.

The node or resource graphs 500B1 and 500B2 of FIGS. 6A and 6B, respectively represent relationships that exist in memory, such as memory 404 of FIG. 4, and which are managed by the framework manager 440 and related data structures that may comprise the nodes 601. The node or resource graph graphs 500B1 and 500B2 can be automatically generated by the framework manager 440 as a useful tool for identifying relationships between respective elements managed by the framework manager 440 and for troubleshooting by a software team.

Figure 7A:
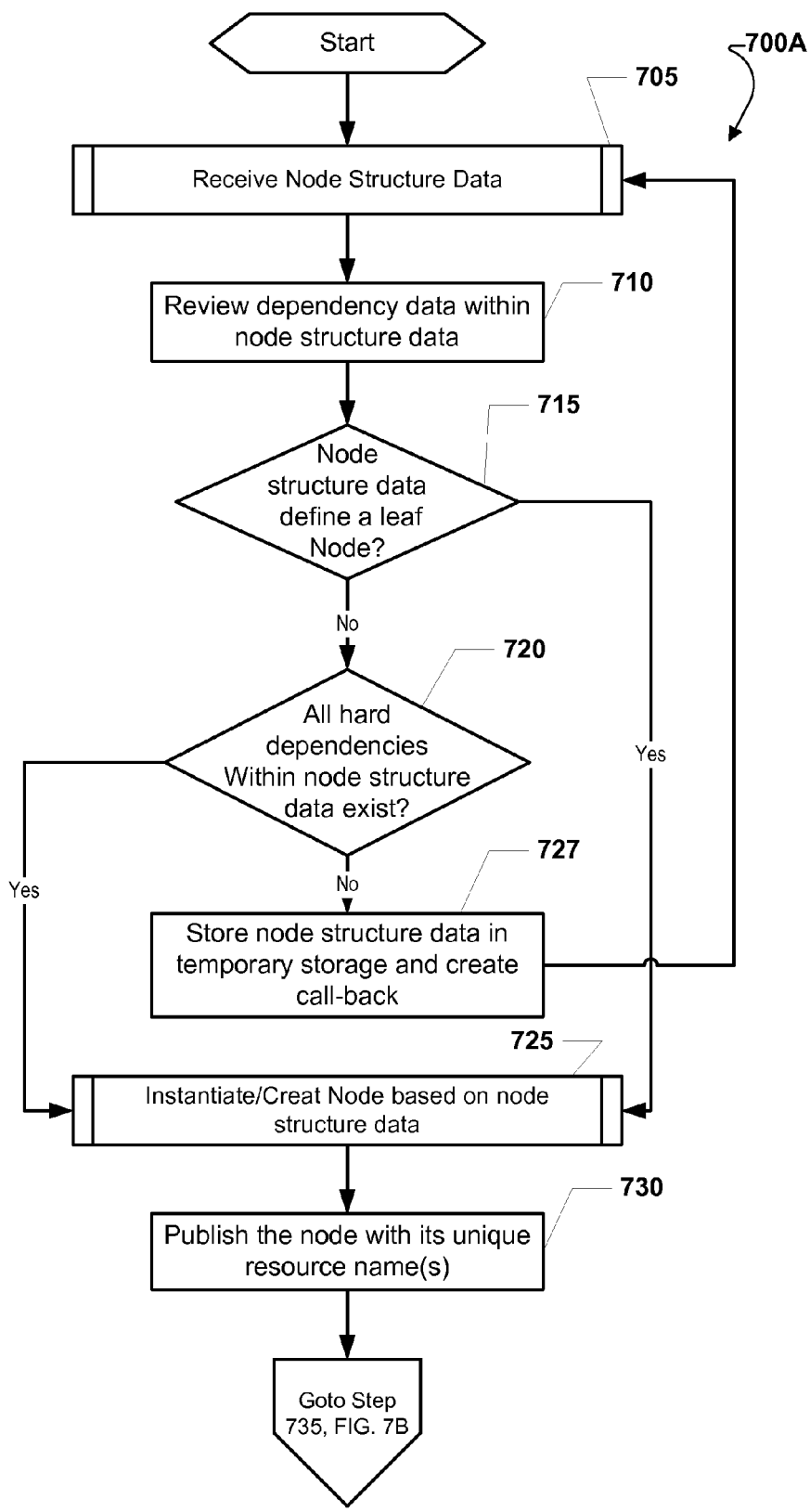
FIG. 7A is a flowchart illustrating a method for creating a software architecture for managing resource(s) of a PCD.

FIG. 7A is a flowchart illustrating a method 700A for creating a software architecture for managing resource(s) of a PCD 100. Block 705 is the first routine of the method or process 700 for managing resources of a PCD 100. In block 705, a routine may be executed or run by the framework manager 440 for receiving node structure data. The node structure data may comprise a dependency array that outlines the dependencies a particular node 601 may have with other nodes 601. Further details about node structure data and this routine or submethod 705 will be described in more detail below in connection with FIG. 8.

Next, in block 710, the framework manager 440 may review the dependency data that is part of the node structure data received in block 705. In decision block 715, the framework manager 440 may determine if the node structure data defines a leaf node 601. A leaf node 601 generally means that the node to be created based on the node structure data does not have any dependencies. If the inquiry to decision block 715 is positive, meaning that the node structure data for creating the current node does not have any dependencies, then the framework manager 440 continues to routine block 725.

If the inquiry to decision block 715 is negative, then the "No" branch is followed to decision block 720 in which the framework manager determines if all of the hard dependencies within the node structure data exist. A hard dependency may comprise one in which a resource cannot exist without. Meanwhile, a soft dependency may comprise one in which a resource may use the dependent resource as an optional step. A soft dependency means that a node 601 or resource of the node 601 which has a soft dependency may be created or instantiated within the node architecture even when the soft dependency does not exist.

An example of a soft dependency may comprise an optimization feature that is not critical to the operation for a resource oriented 601 containing multiple resources. The framework manager 440 may create or instantiate a node or a resource for all hard dependencies that are present and even when a soft is dependency is not present for those nodes or resources which have soft dependencies that are not created. A call back feature may be used to reference the soft dependency so that when the soft dependency becomes available to the framework manager 440, the framework manager 440 will inform each callback referencing the soft dependency that the soft dependencies are now available.

If the inquiry to decision block 720 is negative, then the "No" branch is followed to block 727 in which the node structure data is stored by the framework manager 440 in temporary storage such as memory and the framework manager 440 creates a call back feature associated with this un-instantiated node.

If the inquiry to decision block 715 is positive, then the "Yes" branch is followed to routine 725 in which a node 601 is created or instantiated based on the node structure data received in routine block 705. Further details of routine block 725 will be described below in connection with FIG. 9. Next, in block 730, the framework manager 440 publishes the newly created node 601 using its unique resource name(s) so that other nodes 601 may send information to or receive information from the newly created node 601.

Figure 7B:
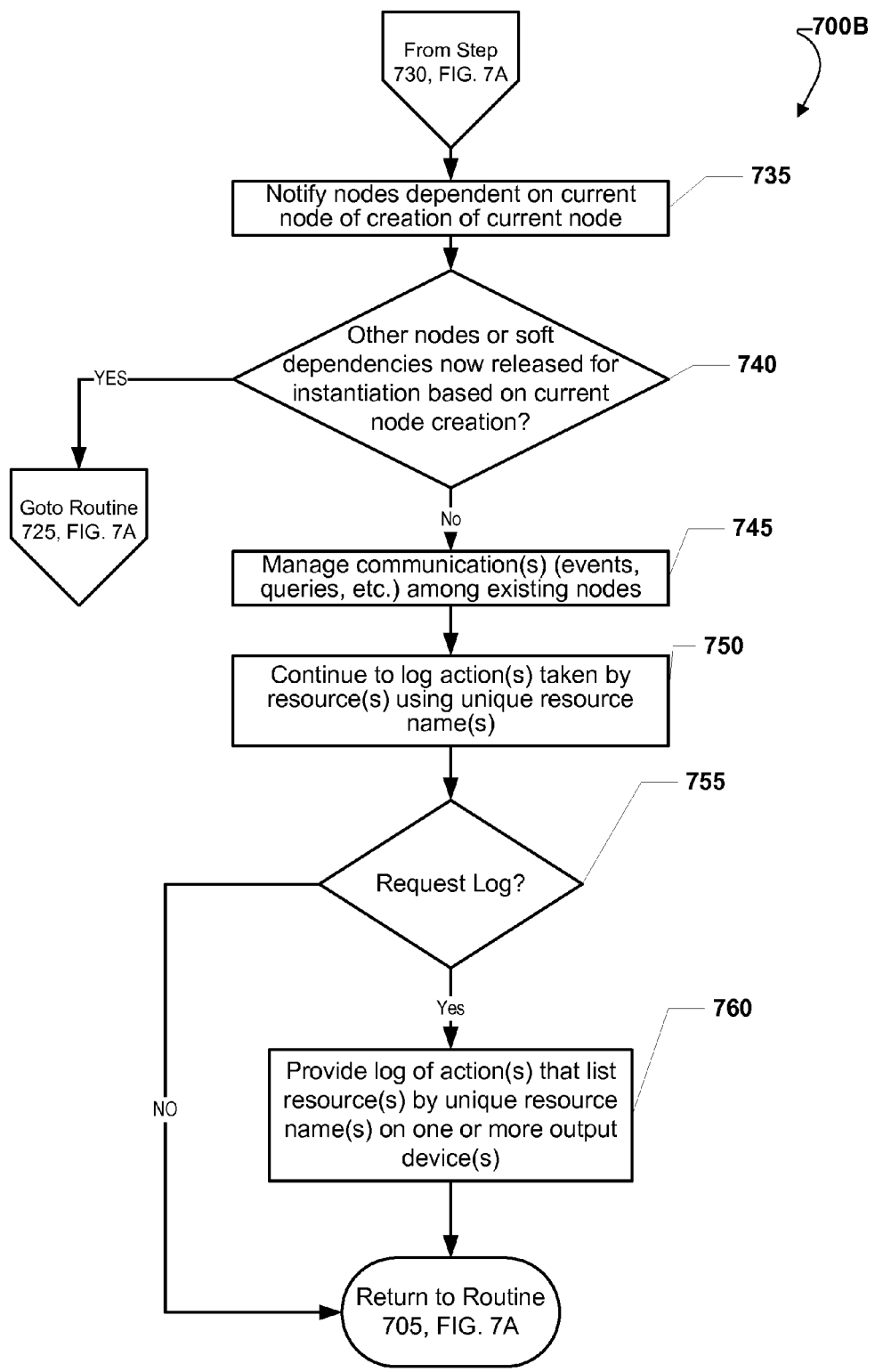
FIG. 7B is a continuation flowchart of FIG. 7A illustrating a method for creating a software architecture for managing resource(s) of a PCD.

Referring now to FIG. 7B which is a continuation flow chart of FIG. 7A, in block 735, the framework manager 440 notifies other nodes 601 which are dependent on the newly created node 601 that the newly created node 601 has been instantiated and is ready to receive or transmit information.

According to one exemplary aspect, notifications are triggered immediately when a dependent node, like node 601B of FIG. 6A, is created, i.e, the notifications are performed recursively. So if node 601B of FIG. 6A is constructed, node 601A is immediately notified. This notification may allow node 601A to be constructed (since node 601B was node 601A's final dependency). Construction of node 601B may causes other nodes 601 to be notified, and so on and so on. Node 601B does not get completed until the final resource dependent on node 601B is completed.

A second, slightly more complex, implementation is to put all of the notifications onto a separate notification queue, and then run through the queue at a single point in time, i.e. the notifications are performed iteratively. So when node 601B of FIG. 6A is constructed, the notification to node 601A is pushed onto a list. Then that list is executed and node 601A gets notified. This causes the notification to other additional nodes 601 (besides node 601A, not illustrated in FIG. 6A) to be put on the same list, and that notification is then sent after the notification to node 601A is sent. The notifications to other nodes 601 (besides the notification to node 601A) doesn't happen until after all the work associated with node 601B and node 601A has been completed.

Logically, these two implementations are exactly equivalent, but they have different memory consumption properties when implemented. The recursive realization is simple but can consume an arbitrary amount of stack space, with the stack consumption being a function of the depth of the dependency graph. The iterative implementation is slightly more complex and requires a bit more static memory (the notification list), but stack usage is constant irrespective of the depth of a dependency graph, such as illustrated in FIG. 6A.

Also, notification of node creation in block 735 is not limited to other nodes. It may also used internally for alias construction. Any arbitrary element in the system 500 can use the same mechanism to request for notification when a node (or marker) becomes available, not just other nodes. Both nodes and non-nodes may use the same notification mechanism.

In decision block 740, the framework manager 440 determines if other nodes 601 or soft dependencies are now released for creation or instantiation based on the creation of the current node 601. Decision block 740 is generally determining if resources may now be created because certain dependency relationships 680 have been fulfilled by the current node which has recently undergone creation or instantiation.

If the inquiry to decision block 740 is positive, then the "Yes" branch is followed back to routine block 725 in which the released node 601 may now be created or instantiated because of the fulfillment of a dependency by the node 601 that was just created.

If the inquiry to decision block 740 is negative, then the "No" branch is followed to block 745 in which the framework manager 440 may manage communications between elements of the software architecture as illustrated in FIGS. 5 and 6. Next, in block 750, the framework manager 440 may continue to log or record actions taken by resources by using the resource names associated with a particular resource. Block 745 may be executed by the framework manager 440 after any action taken by the framework manager 440 or any of the elements managed by the framework manager 440, such as the resources, nodes 601, clients 648, events 695, and query functions 697. Block 745 is yet one important aspect of the invention in which the framework manager 440 may maintain a running log of activity that lists actions performed by each element according to their unique identifier or name provided by the authors who created a particular element, such as a resource of a node 601.

Compared to the prior art, this logging of activity in block 750 that lists unique names assigned to each resource of a system is unique and may provide significant advantages such as used in debugging and error troubleshooting. Another aspect of many that makes the system 500 unique is that separate teams may work on different hardware and/or software elements independently of one another in which each team will be able to use resource names that are unique and easy to track without the need for creating tables to translate less meaningful and usually confusing resource names assigned by other teams and/or the original equipment manufacturer (OEM).

Next, in decision block 755, the framework manager 440 determines if a log of activity recorded by the framework manager 440 has been requested. If the inquiry to decision block 755 is negative, then the "No" branch is followed to the end of the process in which the process returns back to routine 705. If the inquiry to decision block 755 is positive, then the "Yes" branch is followed to block 760 in which the framework manager 440 sends the activity log comprising meaningful resource names and respective actions performed by the resource names to an output device, such as a printer or a display screen and/or both. The process then returns to routine block 705 described above.

Figure 8:
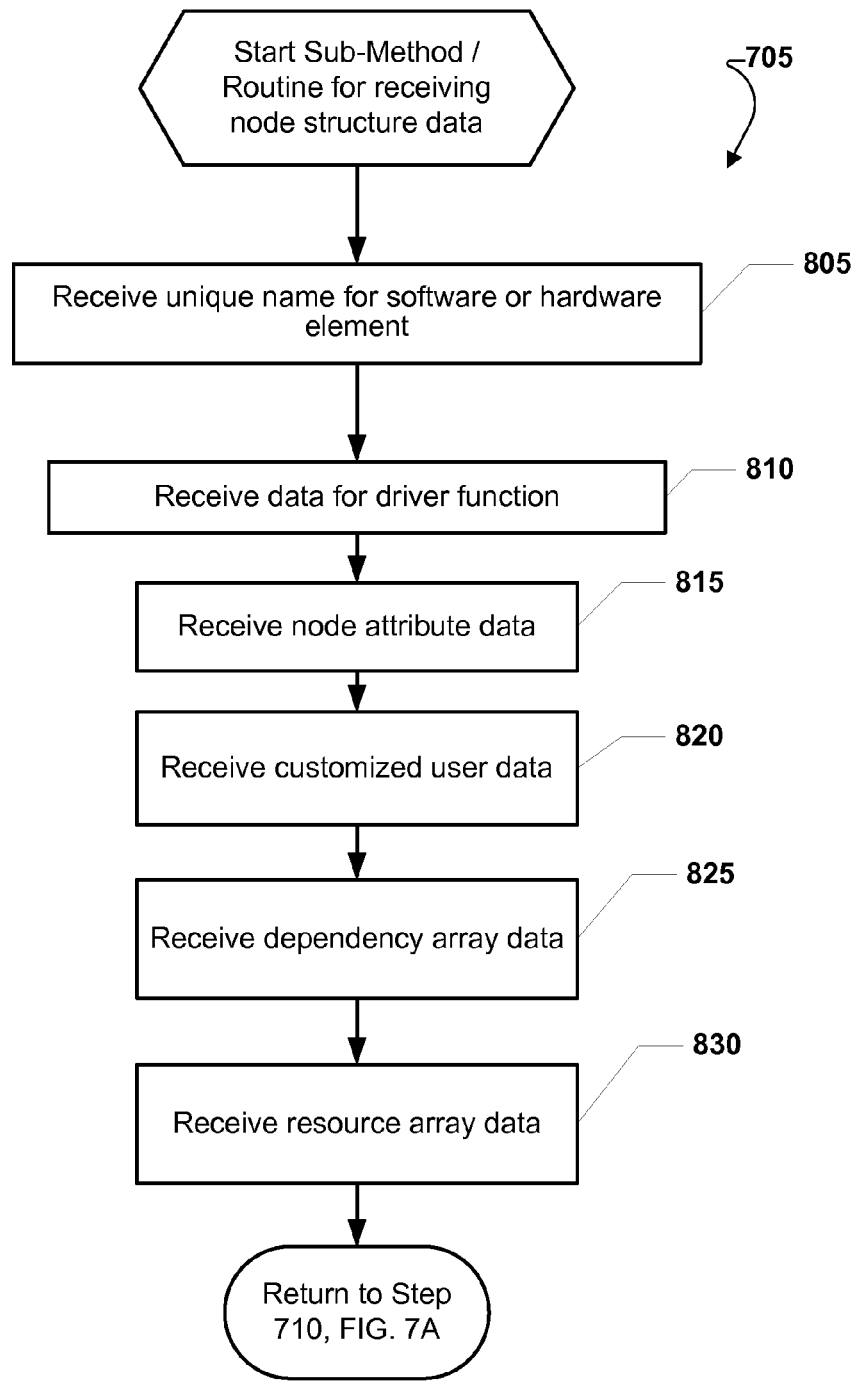
FIG. 8 is a flowchart illustrating a sub-method or a routine of FIGS. 7A-B for receiving node structure data in a software architecture in a PCD.

FIG. 8 is a flowchart illustrating a sub-method or a routine 705 of FIG. 7 for receiving node structure data in a software architecture of a PCD 100. Block 805 is the first step in the sub method or routine 705 of FIG. 7. In block 805, the framework manager 440 may receive a unique name for a software or hardware element, such as the CPU 402 and the clock 442 of FIG. 5. As discussed previously, a node 601 must reference at least one resource. Each resource has a name and that name must be unique in the system 500. All elements within the system 500 may be identified with unique names. Each element has unique name from a character perspective. In other words, generally, there are no two elements within the system 500 which have the same name.

According to exemplary aspects of the system, resources of nodes 601 may generally have unique names across the system, but it is not required that client or event names be unique, though they may be unique as desired.

For convenience, a conventional tree file naming structure or file naming "metaphor" that employs forward slash "/" characters for creating unique names may be employed, such as, but not limited to, "/core/cpu" for CPU 402 and "/clk/cpu" for clock 442. However, as recognized by one of ordinary skill the art, other types of resource names containing any other combination of alpha-numeric characters and/or symbols are well within the scope of the invention.

Next, in block 810, the framework manager 440 may receive data for one or more driver functions associated with one or more resources of the node 601 being created. A driver function generally comprises the action to be completed by one or more resources for a particular node 601. For example, in FIG. 6, the driver function for the resource /core/cpu of node 602 may request the amount of bus bandwidth and the CPU clock frequency it requires in order to provide the requested amount of processing that has been requested. These requests would be made via clients (not illustrated) of the resources in nodes 642 and node 622. The driver function for /clk/cpu in node 642 would usually be responsible for actually setting the physical clock frequency in accordance with the request it received from the /core/cpu resource of node 602.

In block 815, the framework manager 440 may receive node attribute data. The node attribute data generally comprises data that defines the node policies such as security (can the node be accessed via user space applications), remotability (can the node be accessed from other processors in the system) and accessibility (can the resource support multiple concurrent clients). The framework manager 440 may also define attributes that allow a resource to override default framework behavior, such as request evaluation or logging policy.

Subsequently, in block 820, the framework manager 440 may receive customized user data for the particular node 601 being created. The user data may comprise a void "star" field as understood by one of ordinary skill in the art with respect to the "C" programming language. User data is also known to one of ordinary skill in the art as a "trust me" field. Exemplary customized user data may include, but is not limited to, tables such as frequency tables, register maps, etc. The user data received in block 820 is not referenced by the system 500, but allows for customization of a resource if the customization is not recognized or fully supported by the framework manager 440. This user data structure is a base class in the "C" programming language intended to be extended for particular or specific uses.

One of ordinary skill the art recognizes that other kinds of data structures for extending specific uses of a particular class are within the scope of the invention. For example, in the programming language of "C++" (C-plus-plus), an equivalent structure may comprise the key word "public" which would become an extension mechanism for a resource within a node 601.

Next, in block 825, the framework manager 440 may receive dependency array data. The dependency array data may comprise the unique and specific names of one or more resources 601 on which the node 601 being created is dependent. For example, if the first node 602 of FIG. 6B was being created, then in this block 825, the dependency array data may comprise the resource names of the three resources of the second node 622 and the single resource name of the third node 642 on which the first node 602 is dependent.

Subsequently, in block 830, the framework manager 440 may receive resource array data. The resource array data may comprise parameters for the current node being created, such as parameters relevant to the first node 602 of FIG. 6 if this first node 602 was being created. The resource array data may comprise one or more of the following data: the names of other resources; unit; maximum value; resource attributes; plug-in data; and any customized resource data similar to the customize user data of block 820. The plug-in data generally identifies functions retrieved from a software library and usually lists the client types that may be supported by the particular node or plurality of nodes being created. The plugin data also allows for customization of client creation and destruction. After block 830, the process returns to block 710 of FIG. 7.

In FIG. 8, the attribute data block 815, customize user data block 820, and the dependency array data block 825 have been illustrated with dashed lines to indicate that these particular steps are optional and not required for any given node 601. Meanwhile the unique name block 805, a driver function block 810, and resource array data block 830 have been illustrated with solid lines to indicate that these steps of routine 705 are generally mandatory for creating a node 601.

Figure 9:
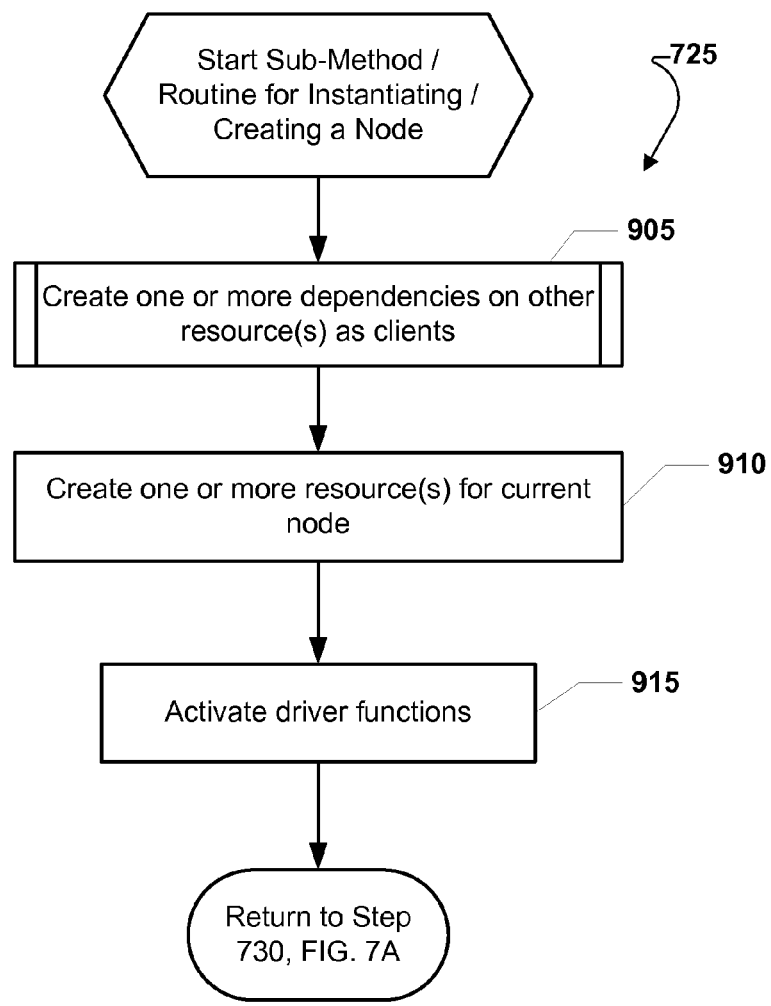
FIG. 9 is a flowchart illustrating a sub-method or a routine of FIGS. 7A-B for creating a node in a software architecture for a PCD.

FIG. 9 is a flowchart illustrating a sub-method or a routine 725 of FIG. 7 for creating a node in a software architecture for a PCD 100. Routine Block 905 is the first routine in the sub-method or routine 725 for instantiating or creating a node 601 according to one exemplary embodiment. In routine block 905, one or more clients 648 that are associated with the node 601 being instantiated are created in this step. Further details about routine block 905 will be described in further detail below in connection with FIG. 12.

In block 910, the framework manager may create or instantiate the one or more resources corresponding to the node structure data of block 705. Next, in block 915, the framework manager 440 may activate the driver functions received in routine block 810 of routine block 705 using the maximum values received in the resource array data block 830 of routine block 705. According to one exemplary aspect, the driver functions may be activated using the maximum values received in the resource array data block 830 of routine block 705. According to another, preferred, exemplary aspect, each driver function may be activated with an optional, initial value that is passed along with the node structure data from routine 705. If initial data is not provided, the driver function is initialized at 0—the minimum value. The driver function is also usually activated in manner such that it is known that it is being initialized. This enables the resource to perform any operations that are specific to initialization, but do not need to be performed during normal or routine operation. The process then returns to step 730 of FIG. 7.

Figure 10:
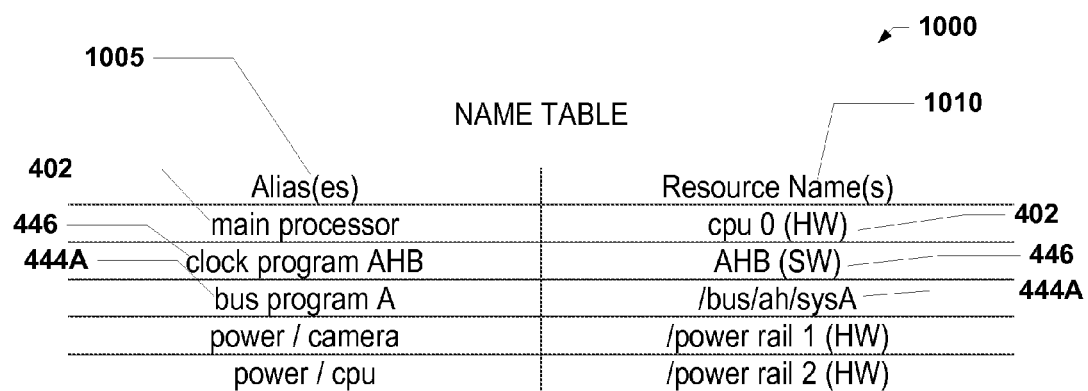
FIG. 10 is a diagram of a data structure for an exemplary name table that may be maintained by a software architecture for a PCD.

FIG. 10 is a diagram of a data structure for an exemplary name table 1000 that may be maintained by a software architecture for a PCD 100. The exemplary name table 1000 may comprise two columns of data. The first column may comprise aliases 1005 corresponding to resources 601 and the second column may comprise the actual resource names 1010 of nodes 601 maintained by the framework manager 440 for managing the relationships between the nodes 601 illustrated in FIG. 6. Multiple aliases may be used for a same resource 601. An alias may be perceived as a dependency and may be created during the creation of a client as described below in connection with FIG. 12.

The name table 1000 allows a first design team, such as an original equipment manufacturer (OEM) for software drivers, focused on certain hardware and/or software elements to provide unique names internal relative to the first design team working on the particular piece of hardware or software. With the name table 1000, second and third (or more) outside design teams may be able to reference the hardware or software elements of the first design team (of the OEM in this example) by using aliases preferred by those of the second and third outside design teams.

For example, an OEM may assign the name "/cpu 0" to the central processing unit 402 of FIG. 5 as illustrated in the first row and second column of the table 1000 in FIG. 10. Meanwhile, a second team of professionals relative to the OEM may desire to assign a different name or alias to the same central processing unit 402. The second team may assign the alias of "main processor" which corresponds to the resource name of "/cpu 0" as illustrated in the first row and first column of the table 1000 of FIG. 10.

Figure 11:
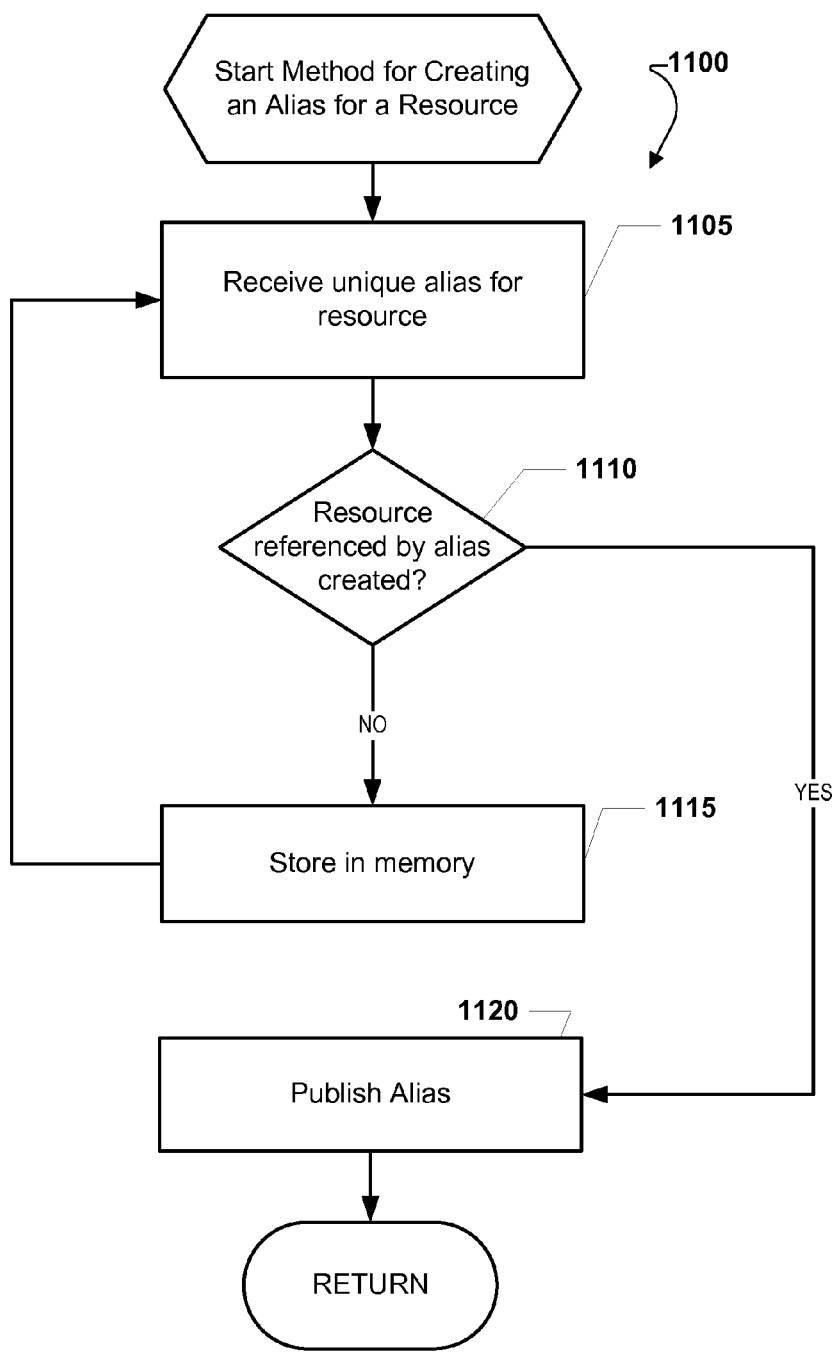
FIG. 11 is a flow chart illustrating a method for creating an alias of a resource in a software architecture for a PCD.

FIG. 11 is a flow chart illustrating a method 1100 for creating an alias of a resource in a software architecture for a PCD 100. Block 1105 is the first step in the method 1100 for creating an alias 1005 of a resource 601. In block 1105, the framework manager 440 receives the alias 1005 selected by a user that corresponds to a particular name 1010 of a resource 601. Next, in decision block 1110 the framework manager 440 determines if the resource referenced by the selected alias has been created by the framework manager 440. One of ordinary skill in the art will appreciate that an alias may be defined against a resource or against another alias. Any name that gets published may be aliased, and not just resource names.

If the inquiry to decision block 1110 is negative, then the "No" branch is followed to block 1115 in which the alias is stored in temporary storage until the resource is created. Specifically, when an alias to an undefined name is created, this alias is stored in memory and the process goes back to waiting for more aliases to be defined. When an alias is instantiated, the alias name is stored in memory along with a callback against the as-yet undefined name (alias). When that undefined name (alias) is published, that notifies the alias, which then causes it to be published. This behavior is essentially the same as the resource creation process when there is a missing dependency.

The process then proceeds back to block 1105. If the inquiry to decision block 1110 is positive, then the "Yes" branch is followed to block 1120 in which the alias is published by the framework manager 440 so that other resources may access the resource corresponding to the alias that has just been created. The process then returns.

Figure 12:
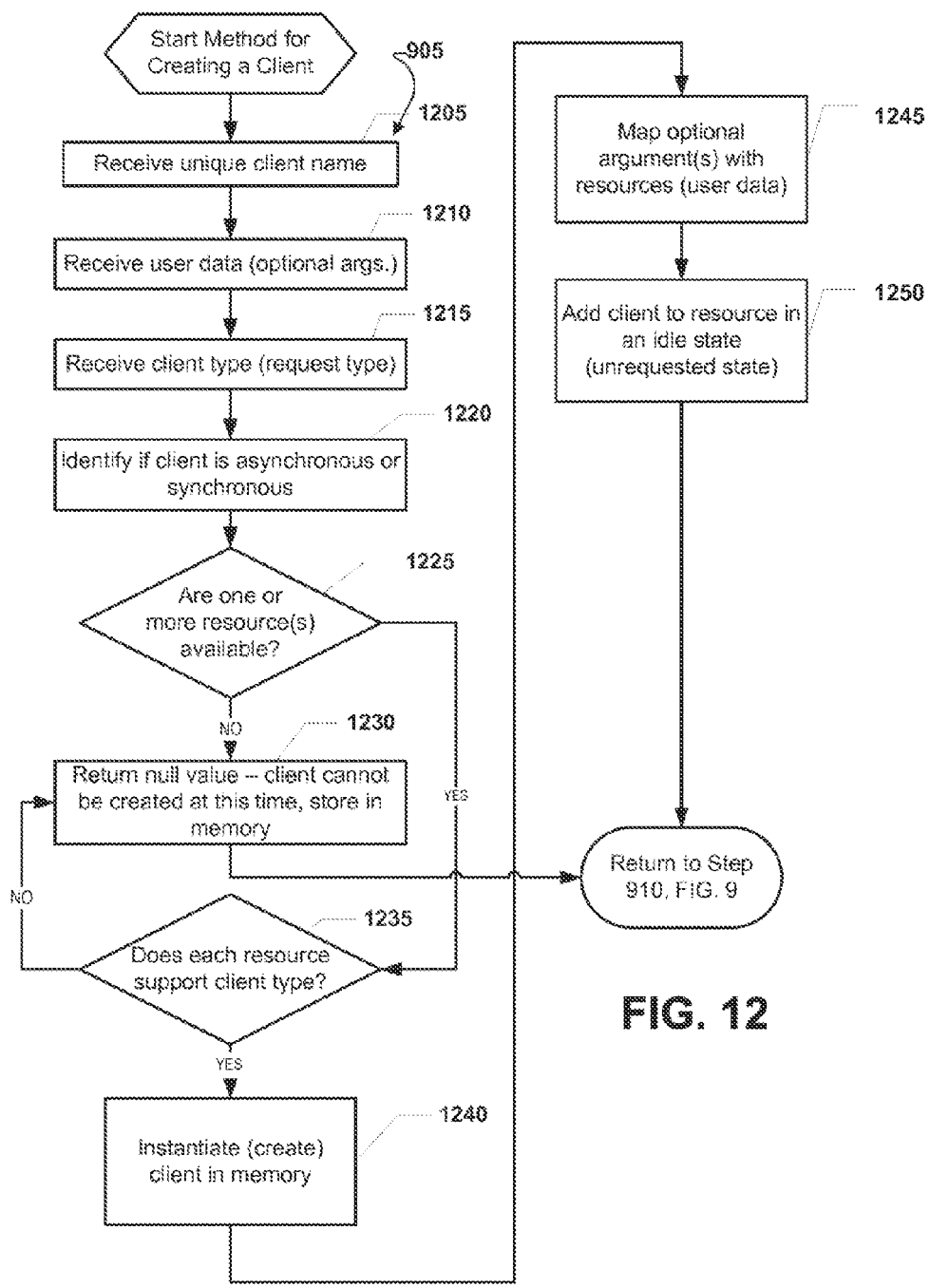
FIG. 12 is a flowchart illustrating a sub-method or a routine of FIG. 9 for creating a client in a software architecture of a PCD.

FIG. 12 is a flowchart illustrating a sub-method or a routine 905 of FIG. 9 for creating a client 648 in a software architecture of a PCD 100. Block 1205 is the first step of routine block 905 in which a client 648 of one or more resources 601 is created. In block 1205, the framework manager 440 receives a name assigned to the client 648 being created. Similar to resource names, the name for a client 648 may comprise any type of alphanumeric and/or symbols.

Next, in block 1210, customized user data may be received by the framework manager 440 if there are any particular customizations for this client 648 being created. Block 1210 has been illustrated with dashed lines to indicate that the step is optional. The customized user data of block 1210 is similar to the customized user data discussed above in connection with the creation of resources for nodes 601.

In block 1215, the framework manager 440 receives the client type category assigned to the particular client being created. The client type category as of this writing may comprise one of four types: (a) required, (b) impulse, (c) vector, and (d) isochronous. The client type category list may be expanded depending upon the resources being managed by the system 500 and upon the application programs relying upon the resources of the nodes 601.

The required category generally corresponds with the processing of a scalar value that is passed from the required client 648 to a particular resource 601. For example, a required request may comprise a certain number of millions of instructions per second (MIPs). Meanwhile, the impulse category generally corresponds with the processing of a request to complete some activity within a certain period of time without any designation of a start time or stop time.

An isochronous category generally corresponds with a request for an action that is typically reoccurring and has a well-defined start time and a well-defined end time. A vector category generally corresponds with an array of data that usually is part of multiple actions that are required in series or in parallel.

Subsequently, in block 1220, the framework manager 440 receives data that indicates whether the client 648 has been designated as synchronous or asynchronous. A synchronous client 648 is one that typically requires the framework manager 440 lock a resource of a node 601 until the resource 601 returns data and an indication that the resource 601 has finished completing the requested task from the synchronous client 648.

On the other hand, an asynchronous client 648 may be handled by one or more threads 436 (See FIG. 4) in parallel which are accessed by the framework manager 440. The framework 440 may create a callback to a thread 436 and may return a value when the callback has been executed by a respective thread 436. One of ordinary skill the art recognizes that the asynchronous client 648 does not lock up a resource like a synchronous client 648 does when the task of the synchronous client 648 is being executed.

After block 1220, in decision block 1225, the framework manager 440 determines if the resource identified by the client 645 are available. If the inquiry to decision block 1225 is negative, then the "No" branch is followed to block 1230 in which a null value or message is returned to a user indicating that the client 648 cannot be created at this time.

If the inquiry to decision block 1225 is positive, then the "Yes" branch is followed to decision block 1235 in which the framework manager 440 determines if each resource identified by the client 648 supports the client type provided in block 1210. If the inquiry to decision block 1235 is negative, then the "No" branch is followed back to block 1230 in which a null value or message is returned indicating that the client 648 cannot be created at this time.

If the inquiry to decision block 1235 is positive, then the "Yes" branch is followed to block 1240 in which the framework manager 440 creates or instantiates the client 648 in memory. Next, in block 1245, if any customized user data is received in block 1210, such as optional arguments, then these optional arguments may be mapped with their respective resources a particular nodes 601. Next, in block 1250, the newly created client 645 is coupled to its corresponding one or more resources in an idle state or on requested state as illustrated in FIG. 6B described above. The process then returns to block 910 of FIG. 9.

Figure 13:
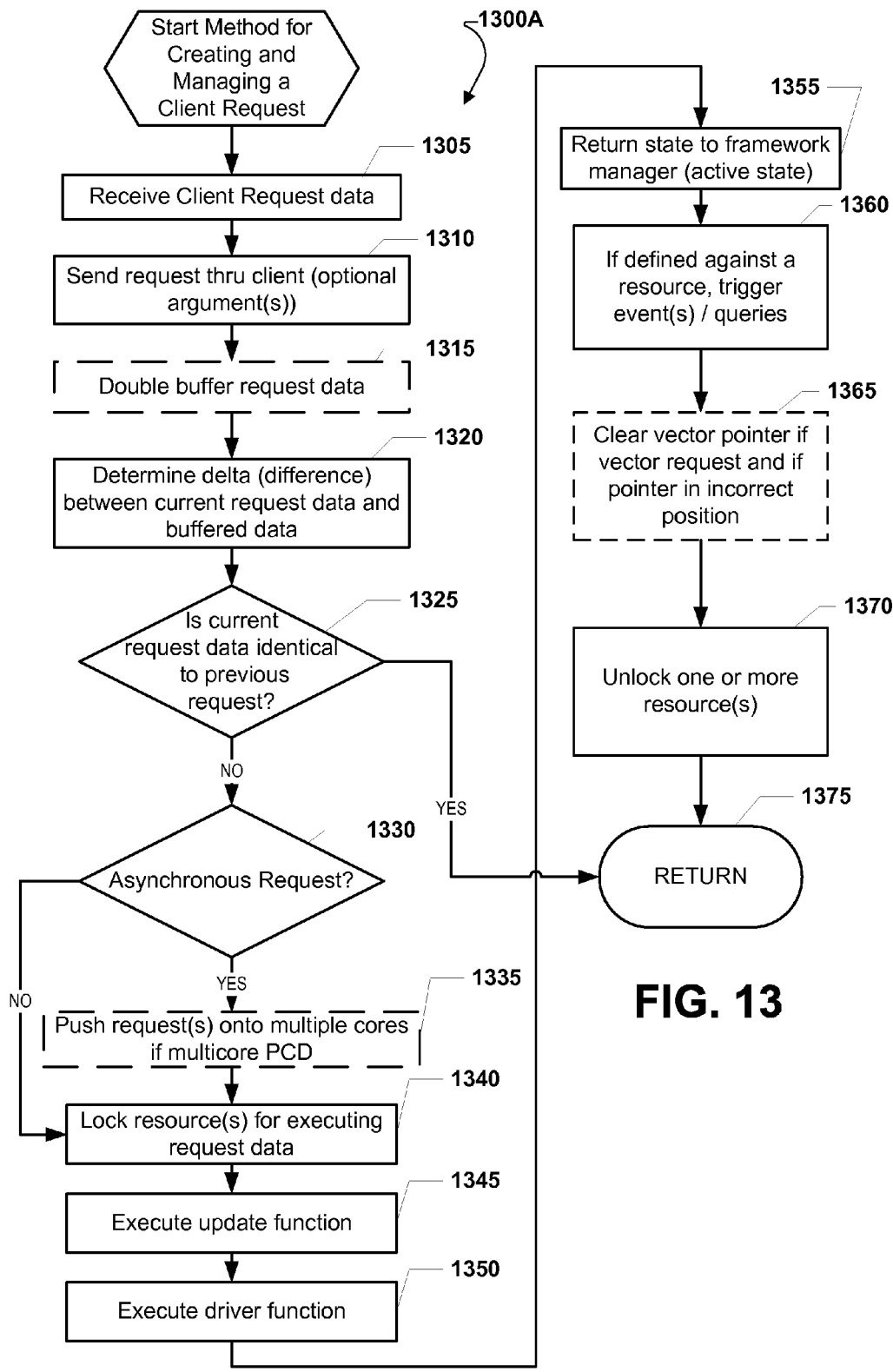
FIG. 13 is a flow chart illustrating a method for creating a client request against a resource in a software architecture for a PCD.

FIG. 13 is a flow chart illustrating a method 1300 for creating a client request 675 against a resource 601 in a software architecture for a PCD 100. The method 1300 is generally executed after client creation and node creation as described above in connection with FIG. 7 and FIG. 12. Block 1305 is the first step in the method 1300 for creating a client request 675 against the resource 601. This method 1300 will describe how the following three types of requests 675 are handled by the framework manager 440: (a) required, (b) impulse, and (c) vector. The handling of the fourth type of request 675, the (d) isochronous request, will be described below in connection with FIG. 15. As the names of the requests 675 mentioned above suggest, client requests 675 generally correspond with client types that were created and described above in connection with FIG. 12.

In block 1305, the framework manager 440 may receive the data associated with a particular client request 675 such as one of the three mentioned above: (a) required, (b) impulse, and (c) vector. The data associated with a required request generally comprises a scalar value that is passed from the required client 648 to a particular resource 601. For example, a required request may comprise a certain number of millions of instructions per second (MIPs). Meanwhile, an impulse request comprises a request to complete some activity within a certain period of time without any designation of a start time or stop time. Data for a vector request generally comprises an array of multiple actions that are required to be completed in series or in parallel. A vector request may comprise an arbitrary length of values. A vector request usually has a size value and an array of values. Each resource of a node 601 may be extended to have a pointer field in order to support a vector request. In the "C" programming language, the pointer field is supported by the union function as understood by one of ordinary skill in the art.

Next, in block 1310, the framework manager 440 issues the request through the client 648 that was created by the method described above in connection with FIG. 13. Subsequently, in block 1315, the framework manager 440 double buffers the request data being passed through the client if the request is a required type or a vector type. If the request is an impulse type, then block 1315 is skipped by the framework manager 1440.

For required requests, in this block 1315, values from a prior request are maintained in memory so that the framework manager 440 can determine if there is any difference between the previous requested values in the current set of requested values. For vector requests, prior requests are usually not maintained in memory, although a resource of a node 601 may maintain it as desired for a particular implementation. Therefore, block 1315 is optional for vector types of requests.

In block 1320, the framework manager 440 calculates the delta or difference between the previous set of requested values in the current set of requested values. In decision block 1325, the framework manager determines if the current set of requested values is identical to the previous set of requested values. In other words, the framework manager 440 determines if a difference exists between the current set of requested values and the previous set of requested values. If there is no difference between the current set and previous set of requested values, then the "Yes" branch is followed (which skips blocks 1330 through block 1370) to block 1375 in which the process ends.

If the inquiry to decision block 1325 is negative, meaning that the set of requested values are different relative to the set of pre-previous requested values, then the "No" branch is followed to decision block 1330.

In decision block 1330, the framework manager 440 determines if the current request is an asynchronous request. If the inquiry to decision block 1330 is negative, then the "No" branch is followed to block 1340 in which the resource 601 corresponding to the client request 675 is locked by the framework manager 440. If the inquiry to decision block 1330 is positive, meaning that the current request is asynchronous request type, then the "Yes" branch is followed to block 1335 in which the request may be pushed onto another thread and may be executed by another core if a multicore system, like that of FIG. 4, is currently managed by the framework manager 440. Block 1335 has been illustrated with dashed lines to indicate that this step may be optional if the PCD 100 is a single core central processing system.

Subsequently, in block 1340, the resources 601 corresponding to the request 675 is locked by the framework manager 440. Next, in block 1345, the resource 601 executes the update function which generally corresponds to the plug-in data of the resource array data received in block 830 of FIG. 8. The update function generally comprises a function responsible for the new resource state in light of a new client request. The update function compares its previous state with the requested state in the client request. If the requested state is greater than the previous state, then the update function will perform the client request. However, if the requested state is equal to or less than the current state and which the resource is operating at, then the client request will not be performed in order to increase the efficiency since the old state achieves or satisfies the requested state. An update function takes a new request from the client and aggregates it with all the other active requests to determine the new state for the resource.

As an example, multiple clients may be requesting a bus clock frequency. The update function for the bus clock would usually take the maximum of all the client requests and use that as the new desired state for the bus clock. It is not the case that all resources will use the same update function, although there are some update functions that will be used by multiple resources. Some common update functions are to take the maximum of client requests, to take the minimum of client requests and to sum the client request. Or resources may define their own custom update function if their resource needs to aggregate requests in some unique way.

Next, in block 1350, the framework manager 440 passes the data to the resource corresponding to the client request 648 so that the resource may execute the driver function which is specific to the resource of a node 601. A driver function applies the resource state as computed by the update function. This may entail updating hardware settings, issuing requests to dependent resources, calling legacy functions or some combination of the above.

In the previous example, the update function computed the requested bus clock frequency. The driver function may receive that requested frequency and it may update the clock frequency control HW to run at that frequency. Note that sometimes it is not possible for the driver function to meet the exact requested state that update function has computed. In this case, the driver function may choose the frequency that best meets the request. For example, the bus clock HW may only be able to run at 128 MHz and 160 MHz, but the requested state might be 150 MHz. In this case, the driver function should run at 160 MHz, as that exceeds the requested state.

Next, in block 1355, the framework 440 receives state control from the resource which have executed the driver function in block 1350. Subsequently, in block 1360, if defined against the resource, events 690 may be triggered so that data is passed back to the client 648 which corresponds to the event 690. Events may be processed in another thread. This may minimize the amount of time spent with the resources locked and allows for more parallel operation in a multicore system as illustrated in FIG. 4. One or more events 690 may be defined against a resource in a manner similar to how a request may be defined against a resource as described in this method 1300. In other words, the event creation process may largely parallel the client creation process. One thing that is different with the events is that it is possible to define events that only get triggered when certain thresholds are crossed.

This defining of events that only get triggered based on thresholds allows for notification of when a resource is getting oversubscribed (it has more concurrent users than it can support) which is indicative of a system overloading condition, or when a resource goes low/off, which may allow other things to be shut off, restore functionality that was disabled when the system became oversubscribed, etc. Because the event registration may be done with thresholds, it reduces the amount of work the system has to do on event notification to only happen when there is something really necessary. It is also possible to register for an event on every state change.

Next, in optional block 1365, if the request being processed is a vector request, then this optional block 1365 is usually performed. Optional block 1365 generally comprises a check or determination to assess whether the vector pointer is still positioned on the same data that the user passed into the vector. If the inquiry to this optional block 1365 is positive, meaning that the pointer is still pointing to the same data which was passed by the user into the vector, then the pointer is cleared out so that references to old data is not maintained. This optional block 1365 is generally performed to account for the double buffering block 1315 described above when a vector request is being processed, compared to an impulse request and a required request.

Subsequently, in block 1370, the framework 440 unlocks the requested resource so that other client requests 648 may be handled by the current but now released requested resource of a particular node 601. The process then returns to the first block 1305 for receiving the next client request.

Figure 14:
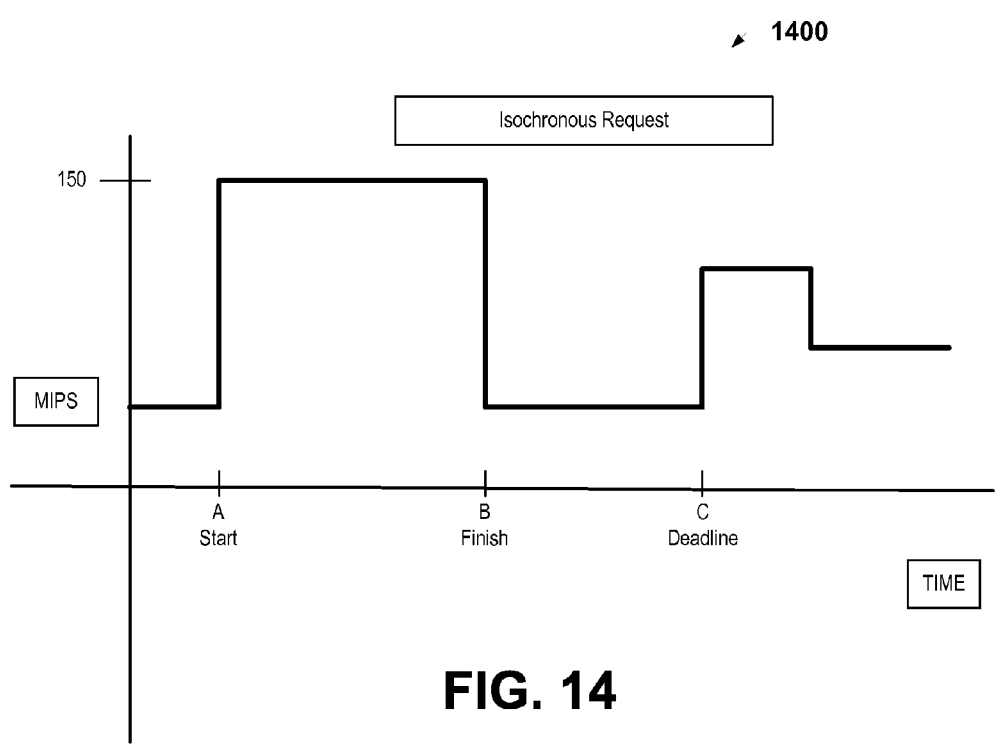
FIG. 14 is a diagram illustrating work requested in an isochronous client request for a resource of a PCD.

FIG. 14 is a diagram 1400 illustrating work requested in an isochronous client request for a resource of a PCD 100. The diagram 1400 comprises a graph having an X-axis and a Y-axis. The X-axis generally comprises time elapsed while the Y-axis may comprise a requested action value such as a requested million of instructions per second (MIPs). As noted previously, an isochronous client request generally comprises a well defined start time A and a well-defined end time or deadline C. In the exemplary embodiment illustrated in FIG. 14, the graph indicates that the requested work of 150 MIPs was started at time A and was finished at time B, in which time B occurred prior to the requested deadline of time C.

Figure 15:
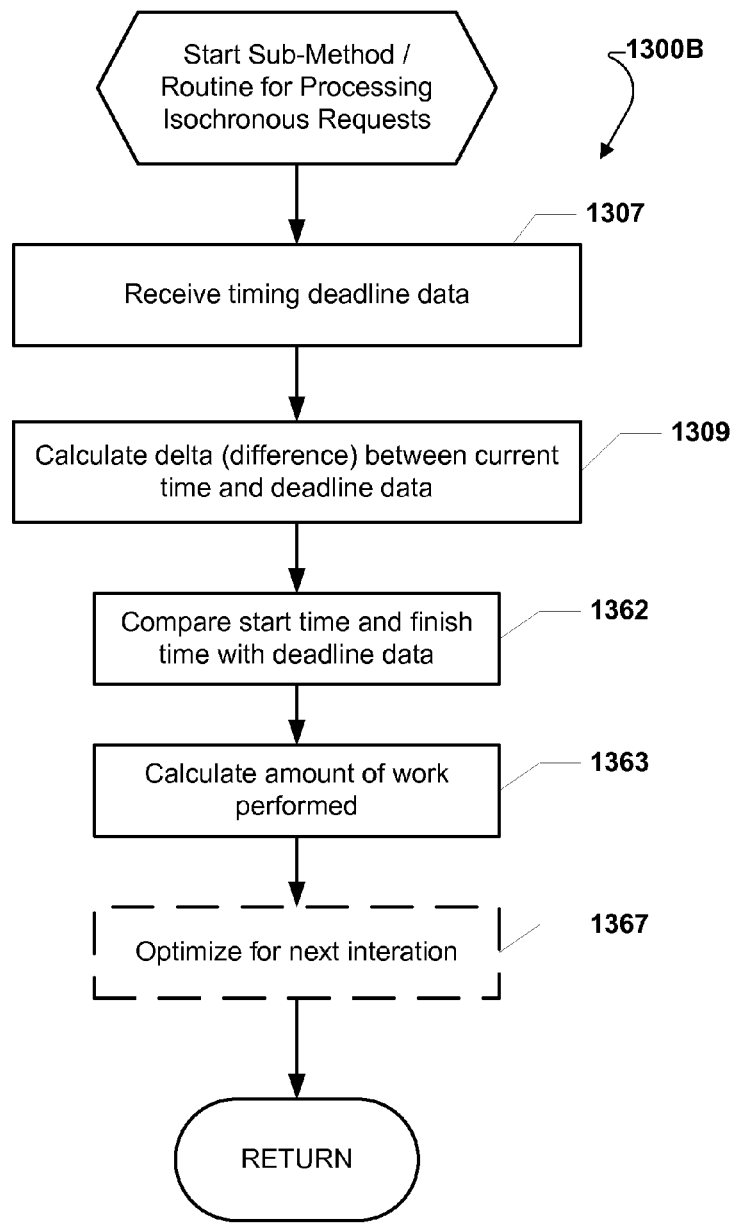
FIG. 15 is a flow chart illustrating a sub-method or a routine of FIG. 9 for creating a isochronous client request against a resource in a software architecture for a PCD.

FIG. 15 is a flow chart illustrating a sub-method or a routine 1300B of FIG. 9 for creating a isochronous client request against a resource in a software architecture for a PCD 100. This sub-method or routine 1300B builds off of or is executed in conjunction with the steps described above in connection with FIG. 13. This means that the steps enumerated in this FIG. 15 are positioned in sequence corresponding to the reference numerals provided in FIG. 13. As described in more detail below, invention is not limited to the order or sequence of steps when such order or sequence does not impact the desired output from the executed steps.

Block 1307 is the first step of the sub-method or routine for processing isochronous requests 675. Block 1307 occurs after block 1305 and before block 1310 of FIG. 13. In block 1307, the framework manager 440 may receive the deadline data such as deadline C as discussed above in connection with FIG. 14.

Next in block 1309, the framework manager 440 may calculate a difference between the current time and the deadline provided in block 1307. Subsequently in block 1362, which occurs after block 1360 but before block 1365 of FIG. 13, the framework manager 440 compares the start time A and finish time B with the deadline C (See FIG. 14). In block 1363, because the framework manager 440 was provided with the amount of activity requested and because the framework manager 440 tracks the start time A and finish time B, then in block 1363 the framework manager 440 may calculate the amount of work that was performed by the resource of a particular node 601.

Next, in block 1367, which occurs after block 1365 and before block 1370 of FIG. 13, an optimization process may be executed. Block 1367 has been illustrated with dashed lines to indicate that the step is optional or that this step may be performed off-line and off device relative to the PCD 100. The optimization process may attempt to determine how the work may be best completed between the start time in the deadline while taking into account many different variables such as power consumption and responsiveness. In some exemplary embodiments, this block 1367 may be entirely skipped altogether without departing from the scope of the invention. The process then returns to block 1305 of FIG. 13 for processing the next client request 675.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for managing resources of a single portable computing device having a plurality of device resources controlled by at least one processor, the method comprising:

receiving node structure data with a framework manager for forming a node, the node structure data comprising a unique name for each resource contained within the single portable computing device that is part of the node, each resource comprising at least one of a hardware element and a software element contained within the single portable computing device;

reviewing the node structure data with the framework manager for one or more dependencies that exist within the single portable computing device;

determining with the framework manager if each resource associated with a dependency exists within a node framework for the single portable computing device, the node framework defined by a graph with the framework manager wherein each node of the graph represents one or more resources controlled by the processor of the single portable computing device, wherein at least one node of the graph represents a plurality of resources controlled by the processor of the single portable computing device, wherein each node of the graph is configured to manage a client request issued by a client of the node within the single portable computing device, wherein the client corresponds to a keypress action occurring within an application program supported by the portable computing device, and wherein coupling between adjacent nodes of the graph represent resource dependencies that exist within the single portable computing device;

if a resource associated with a dependency does not exist, then storing by the framework manager the node structure data in a temporary storage within the single portable computing device;

if each resource for each dependency exists, then instantiating by the framework manager the node and its one or more corresponding resources for supporting the single portable computing device, wherein instantiating the node includes creating at least one client associated with the node being instantiated, wherein the client identifies the one or more resources corresponding to the instantiated node associated with the client, wherein creating the at least one client associated with the node being instantiated includes receiving a client type category assigned to the client being created, determining if the one or more resources identified by the client are available, if the one or more resources corresponding to the instantiated node associated with the client are available, then determining if the one or more resources identified by the client support the client type assigned to the client, if the one or more resources identified by the client support the client type assigned to the client, then creating the client, if the one or more resources identified by the client do not support the client type assigned to the client, then returning a message indicating that the client cannot be created, if the one or more resources corresponding to the instantiated node associated with the client are not available, then returning a message indicating that the client cannot be created, coupling the created client to its corresponding one or more resources in an idle or requested state;

if the node is instantiated, then publishing the node within the node framework using the one or more unique names corresponding node's one or more resources so that other nodes are able to send information to or receive information from the newly instantiated node within the single portable computing device, and managing communications among one or more nodes of the node framework and recording activity of each resource in memory by its unique name.

2. The method of claim 1, further comprising notifying one or more nodes dependent on a current node of its creation.

3. The method of claim 1, further comprising displaying recorded activity of each resource by its unique name on an output device.

4. The method of claim 3, wherein the output device comprises at least one of a video display, a file, a serial port, a wireless interface, and a printer.

5. The method of claim 1, further comprising receiving client request data comprising vector data.

6. The method of claim 5, further comprising checking a status of a vector pointer after a vector request has been executed.

7. The method of claim 6, further comprising resetting the vector pointer.

8. The method of claim 1, wherein the portable computing device comprises at least one of a mobile telephone, a personal digital assistant, a pager, a smartphone, a navigation device, and a hand-held computer with a wireless connection or link.

9. A computer system for managing resources of a single portable computing device having a plurality of device resources controlled by at least one processor, the system comprising:

a processor operable to:

receive node structure data for forming a node, the node structure data comprising a unique name for each resource contained within the single portable computing device that is part of the node, each resource comprising at least one of a hardware element and a software element contained within the single portable computing device;

review the node structure data for one or more dependencies that exist within the single portable computing device;

determine if each resource associated with a dependency exists within a node framework, the node framework defined by a graph wherein each node of the graph represents one or more resources controlled by the processor of the single portable computing device, wherein at least one node of the graph represents a plurality of resources controlled by the processor of the single portable computing device, wherein each node of the graph is configured to manage a client request issued by a client of the node, wherein the client corresponds to a keypress action occurring within an application program supported by the portable computing device, and wherein coupling between adjacent nodes of the graph represent resource dependencies that exist within the single portable computing device;

if a resource associated with a dependency does not exist, then the processor is operable to store the node structure data in a temporary storage within the single portable computing device;

if each resource for each dependency exists, then the processor is operable to instantiate the node and its one or more corresponding resources for supporting the single portable computing device;

wherein instantiating the node includes creating at least one client associated with the node being instantiated, wherein the client identifies the one or more resources corresponding to the instantiated node associated with the client, wherein creating the at least one client associated with the node being instantiated includes receiving a client type category assigned to the client being created, determining if the one or more resources identified by the client are available, if the one or more resources corresponding to the instantiated node associated with the client are available, determining if the one or more resources identified by the client support the client type assigned to the client, if the one or more resources identified by the client support the client type assigned to the client, then creating the client, if the one or more resources identified by the client do not support the client type assigned to the client, then returning a message indicating that the client cannot be created, if the one or more resources corresponding to the instantiated node associated with the client are not available, then returning a message indicating that the client cannot be created, coupling the created client to its corresponding one or more resources in an idle or requested state;

if the node is instantiated, then the processor is operable to publish the node within the node framework using the one or more unique names corresponding node's one or more resources so that other nodes are able to send information to or receive information from the newly instantiated node within the single portable computing device, and manage communications among one or more nodes of the node framework and record activity of each resource in memory by its unique name.

10. The system of claim 9, wherein the processor is operable to notify one or more nodes dependent on a current node of its creation.

11. The system of claim 9, wherein the processor is operable to display recorded activity of each resource by its unique name on an output device.

12. The system of claim 11, wherein the output device comprises at least one of a video display, a file, a serial port, a wireless interface, and a printer.

13. The system of claim 9, wherein the processor is further operable to receive client request data comprising vector data.

14. The system of claim 9, wherein the processor is further operable to check a status of a vector pointer after a vector request has been executed.

15. The system of claim 14, wherein the processor is further operable to reset the vector pointer.

16. The system of claim 9, wherein the portable computing device comprises at least one of a mobile telephone, a personal digital assistant, a pager, a smartphone, a navigation device, and a hand-held computer with a wireless connection or link.

17. A computer system for managing resources of a single portable computing device having a plurality of device resources controlled by at least one processor, the system comprising:

means for receiving node structure data for forming a node, the node structure data comprising a unique name for each resource contained within the single portable computing device that is part of the node, each resource comprising at least one of a hardware element and a software element contained within the single portable computing device;

means for reviewing the node structure data for one or more dependencies that exist within the single portable computing device;

means for determining if each resource associated with a dependency exists within a node framework for the single portable computing device, the node framework defined by a graph wherein each node of the graph represents one or more resources controlled by the processor of the single portable computing device, wherein at least one node of the graph represents a plurality of resources controlled by the processor of the single portable computing device, wherein each node of the graph is configured to manage a client request issued by a client of the node within the single portable computing device, wherein the client corresponds to a keypress action occurring within an application program supported by the portable computing device, and wherein coupling between adjacent nodes of the graph represent resource dependencies that exist within the single portable computing device;

means for storing the node structure data in a temporary storage within the single portable computing device if a resource associated with a dependency does not exist;

means for instantiating the node and its one or more corresponding resources for supporting the single portable computing device if each resource for each dependency exists, wherein the means for instantiating the node includes means for creating at least one client associated with the node being instantiated, wherein the client identifies the one or more resources corresponding to the instantiated node associated with the client wherein the means for creating the at least one client associated with the node being instantiated includes means for receiving a client type category assigned to the client being created, means for determining if the one or more resources identified by the client are available, if the one or more resources corresponding to the instantiated node associated with the client are available, then determining if the one or more resources identified by the client support the client type assigned to the client, if the one or more resources identified by the client support the client type assigned to the client, then creating the client, if the one or more resources identified by the client do not support the client type assigned to the client, then returning a message indicating that the client cannot be created, if the one or more resources corresponding to the instantiated node associated with the client are not available, then returning a message indicating that the client cannot be created, means for coupling the created client to its corresponding one or more resources in an idle or requested state;

means for publishing the node within the node framework using the one or more unique names corresponding node's one or more resources if the node is instantiated, so that other nodes are able to send information to or receive information from the newly instantiated node within the single portable computing device, and means for managing communications among one or more nodes of the node framework and recording activity of each resource in memory by its unique name.

18. The system of claim 17, further comprising notifying one or more nodes dependent on a current node of its creation.

19. The system of claim 17, further comprising means for displaying recorded activity of each resource by its unique name on an output device.

20. The method of claim 19, wherein the output device comprises at least one of a video display, a file, a serial port, a wireless interface, and a printer.

21. The system of claim 17, further comprising means for receiving client request data comprising vector data.

22. The system of claim 17, further comprising means for checking a status of a vector pointer after a vector request has been executed.

23. The system of claim 22, further comprising means for resetting the vector pointer.

24. The system of claim 17, wherein the portable computing device comprises at least one of a mobile telephone, a personal digital assistant, a pager, a smartphone, a navigation device, and a hand-held computer with a wireless connection or link.

25. A computer program product comprising a non-transitory computer usable medium having a computer readable program code embodied therein, said computer readable program code adapted to be executed to implement a method for managing resources of a single portable computing device having a plurality of device resources controlled by at least one processor, said method comprising:

receiving node structure data with a framework manager for forming a node, the node structure data comprising a unique name for each resource contained within the single portable computing device that is part of the node, each resource comprising at least one of a hardware element and a software element contained within the single portable computing device;

reviewing the node structure data with a framework manager for one or more dependencies that exist within the single portable computing device;

determining with the framework manager if each resource associated with a dependency exists within a node framework for the single portable computing device, the node framework defined by a graph with the framework manager wherein each node of the graph represents one or more resources controlled by the processor of the single portable computing device, wherein at least one node of the graph represents a plurality of resources controlled by the processor of the single portable computing device, wherein each node of the graph is configured to manage a client request issued by a client of the node within the single portable computing device, and wherein coupling between adjacent nodes of the graph represent resource dependencies that exist within the single portable computing device;

if a resource associated with a dependency does not exist, then storing by the framework manager the node structure data in a temporary storage within the single portable computing device;

if each resource for each dependency exists, then instantiating by the framework manager the node and its one or more corresponding resources for supporting the single portable computing device wherein instantiating the node includes creating at least one client associated with the node being instantiated, wherein the client identifies the one or more resources corresponding to the instantiated node associated with the client, wherein creating the at least one client associated with the node being instantiated includes receiving a client type category assigned to the client being created, determining if the one or more resources identified by the client are available, if the one or more resources corresponding to the instantiated node associated with the client arc available, then determining if the one or more resources identified by the client support the client type assigned to the client, if the one or more resources identified by the client support the client type assigned to the client, then creating the client, if the one or more resources identified by the client do not support the client type assigned to the client, then returning a message indicating that the client cannot be created, if the one or more resources corresponding to the instantiated node associated with the client are not available, then returning a message indicating that the client cannot be created, coupling the created client to its corresponding one or more resources in an idle or requested state;

if the node is instantiated, then publishing the node within the node framework using the one or more unique names corresponding node's one or more resources so that other nodes are able to send information to or receive information from the newly instantiated node within the single portable computing device, and managing communications among one or more nodes of the node framework and recording activity of each resource in memory by its unique name.

26. The computer program product of claim 25, wherein the program code implementing the method further comprises:

notifying one or more nodes dependent on a current node of its creation.

27. The computer program product of claim 25, wherein the program code implementing the method further comprises:

displaying recorded activity of each resource by its unique name on an output device.

28. The computer program product of claim 27, wherein the output device comprises at least one of a video display, a file, a serial port, a wireless interface, and a printer.

29. The computer program product of claim 25, wherein the program code implementing the method further comprises: receiving client request data comprising vector data.

30. The computer program product of claim 25, wherein the program code implementing the method further comprises checking a status of a vector pointer after a vector request has been executed.

31. The computer program product of claim 30, wherein the program code implementing the method further comprises resetting the vector pointer.

32. The computer program product of claim 25, wherein the portable computing device comprises at least one of a mobile telephone, a personal digital assistant, a pager, a smartphone, a navigation device, and a hand-held computer with a wireless connection or link.

* * * * *